US009202298B2

(12) United States Patent
Baker et al.

(10) Patent No.: US 9,202,298 B2
(45) Date of Patent: Dec. 1, 2015

(54) SYSTEM AND METHOD FOR EFFECTIVELY NAVIGATING POLYSEMOUS SYMBOLS ACROSS A PLURALITY OF LINKED ELECTRONIC SCREEN OVERLAYS

(71) Applicants: Bruce R. Baker, Pittsburgh, PA (US); Glenna L. Butler, Wooster, OH (US); Russell T. Cross, Wooster, OH (US); Thomas R. Kovacs, Pittsburgh, PA (US); Cindy C. Halloran, Maumelle, AR (US); John D. Halloran, Maumelle, AR (US); David H. Hershberger, Millersburg, OH (US); Rob Read, Millersburg, OH (US)

(72) Inventors: Bruce R. Baker, Pittsburgh, PA (US); Glenna L. Butler, Wooster, OH (US); Russell T. Cross, Wooster, OH (US); Thomas R. Kovacs, Pittsburgh, PA (US); Cindy C. Halloran, Maumelle, AR (US); John D. Halloran, Maumelle, AR (US); David H. Hershberger, Millersburg, OH (US); Rob Read, Millersburg, OH (US)

(73) Assignee: SEMANTIC COMPACTION SYSTEMS, INC., Pittsburgh, PA (US)

( * ) Notice: Subject to any disclaimer, the term of this patent is extended or adjusted under 35 U.S.C. 154(b) by 0 days.

(21) Appl. No.: 13/826,504

(22) Filed: Mar. 14, 2013

(65) Prior Publication Data

US 2014/0028709 A1     Jan. 30, 2014

Related U.S. Application Data

(60) Provisional application No. 61/676,491, filed on Jul. 27, 2012.

(51) Int. Cl.
*G06T 11/60* (2006.01)
*G09G 5/377* (2006.01)
(Continued)

(52) U.S. Cl.
CPC .............. *G06T 11/60* (2013.01); *G06F 3/0482* (2013.01); *G06F 3/04817* (2013.01);
(Continued)

(58) Field of Classification Search
CPC . G06F 3/0482; G06F 3/04886; G06F 3/0236; G06F 3/0238; G06F 3/04817; G06F 3/0489; G06F 21/36; G06F 17/2735; G09G 2340/12; G09G 5/377
USPC ......... 345/629, 173, 168, 172, 169, 589, 592; D14/485, 489, 492; 178/18.01, 18.03; 704/10, 276, 235, 260, 271; 715/835, 715/259, 763, 764, 771, 773, 808, 825, 840, 715/866; 400/472; 434/112, 169, 185; 708/145, 146
See application file for complete search history.

(56) References Cited

U.S. PATENT DOCUMENTS 4,661,916 A   4/1987   Baker et al.
5,097,425 A   3/1992   Baker et al.
(Continued)

FOREIGN PATENT DOCUMENTS

KR   10-2011-0046434   5/2011

OTHER PUBLICATIONS

International Search Report and Written Opinion for PCT/US2013/052232 dated Nov. 1, 2013.
(Continued)

*Primary Examiner* — Jin-Cheng Wang
(74) *Attorney, Agent, or Firm* — Harness, Dickey & Pierce, P.L.C.

(57) ABSTRACT

A method, apparatus and computer readable medium are disclosed. In at least one embodiment, the method includes providing polysemous symbols for selection on an initial electronic screen overlay displayed on a display; storing, in a memory, a plurality of the selectable polysemous symbols in association with a pointer identifying display of an electronic screen overlay which is different from the initial electronic screen overlay; and displaying a second electronic screen overlay on the display, in response to initial selection of one of the provided polysemous symbols. In at least one embodiment, the second electronic screen overlay is the electronic screen overlay associated with the selected polysemous symbol.

51 Claims, 13 Drawing Sheets

(51) Int. Cl.
  *G06F 17/27* (2006.01)
  *G06F 3/0482* (2013.01)
  *G06F 17/30* (2006.01)
  *G09G 5/14* (2006.01)
  *G06F 3/0488* (2013.01)
  *G06F 3/0481* (2013.01)

(52) U.S. Cl.
  CPC ....... *G06F 3/04886* (2013.01); *G06F 17/2735* (2013.01); *G06F 17/30386* (2013.01); *G06F 17/30637* (2013.01); *G09G 5/14* (2013.01); *G09G 5/377* (2013.01); *G09G 2340/12* (2013.01); *G09G 2354/00* (2013.01)

(56) References Cited

U.S. PATENT DOCUMENTS

| | | | |
|---|---|---|---|
| 5,210,689 A | 5/1993 | Baker et al. | |
| 5,297,041 A | 3/1994 | Kushler et al. | |
| 5,748,177 A | 5/1998 | Baker et al. | |
| 5,920,303 A * | 7/1999 | Baker et al. | 345/172 |
| 6,323,846 B1 | 11/2001 | Westerman et al. | |
| 6,570,557 B1 | 5/2003 | Westerman et al. | |
| 6,646,573 B1 | 11/2003 | Kushler et al. | |
| 6,677,932 B1 | 1/2004 | Westerman | |
| 6,778,995 B1 | 8/2004 | Gallivan | |
| 7,076,738 B2 | 7/2006 | Baker et al. | |
| 7,319,957 B2 | 1/2008 | Robinson et al. | |
| 7,506,256 B2 | 3/2009 | Baker et al. | |
| 7,614,008 B2 | 11/2009 | Ording | |
| 7,626,574 B2 | 12/2009 | Kim | |
| 7,653,883 B2 | 1/2010 | Hotelling et al. | |
| 7,657,849 B2 | 2/2010 | Chaudhri et al. | |
| 7,663,607 B2 | 2/2010 | Hotelling et al. | |
| 7,672,950 B2 | 3/2010 | Eckardt, III et al. | |
| 7,679,534 B2 | 3/2010 | Kay et al. | |
| 7,712,053 B2 | 5/2010 | Bradford et al. | |
| 7,720,682 B2 | 5/2010 | Stephanick et al. | |
| 7,844,914 B2 | 11/2010 | Andre et al. | |
| 7,881,936 B2 | 2/2011 | Longe et al. | |
| 7,966,578 B2 | 6/2011 | Tolmasky et al. | |
| 8,065,154 B2 * | 11/2011 | Schindler et al. | 704/271 |
| 8,095,364 B2 | 1/2012 | Longe et al. | |
| 8,234,589 B2 | 7/2012 | Baker et al. | |
| 8,239,784 B2 | 8/2012 | Hotelling et al. | |
| 8,279,180 B2 | 10/2012 | Hotelling et al. | |
| 8,381,135 B2 | 2/2013 | Hotelling et al. | |
| 8,381,137 B2 | 2/2013 | Bradford et al. | |
| 8,402,026 B2 | 3/2013 | Gallivan | |
| 8,577,279 B2 * | 11/2013 | Baker et al. | 434/350 |
| 2002/0015024 A1 | 2/2002 | Westerman et al. | |
| 2002/0163544 A1 | 11/2002 | Baker et al. | |
| 2002/0196163 A1 | 12/2002 | Bradford et al. | |
| 2003/0210280 A1 * | 11/2003 | Baker et al. | 345/835 |
| 2005/0010555 A1 | 1/2005 | Gallivan | |
| 2005/0017954 A1 | 1/2005 | Kay et al. | |
| 2005/0192802 A1 | 9/2005 | Robinson et al. | |
| 2005/0234722 A1 | 10/2005 | Robinson et al. | |
| 2005/0283358 A1 | 12/2005 | Stephanick et al. | |
| 2005/0283364 A1 | 12/2005 | Longe et al. | |
| 2006/0026521 A1 | 2/2006 | Hotelling et al. | |
| 2006/0026536 A1 | 2/2006 | Hotelling et al. | |
| 2006/0033724 A1 | 2/2006 | Chaudhri et al. | |
| 2006/0106847 A1 | 5/2006 | Eckardt, III et al. | |
| 2006/0122838 A1 * | 6/2006 | Schindler et al. | 704/271 |
| 2006/0148520 A1 | 7/2006 | Baker et al. | |
| 2006/0190256 A1 | 8/2006 | Stephanick et al. | |
| 2006/0197753 A1 | 9/2006 | Hotelling | |
| 2006/0247915 A1 | 11/2006 | Bradford et al. | |
| 2007/0106492 A1 | 5/2007 | Kim | |
| 2007/0110222 A1 | 5/2007 | Kim | |
| 2007/0152980 A1 | 7/2007 | Kocienda et al. | |
| 2007/0255570 A1 | 11/2007 | Annaz et al. | |
| 2008/0233546 A1 * | 9/2008 | Baker et al. | 434/169 |
| 2009/0150828 A1 | 6/2009 | Baker et al. | |
| 2010/0106752 A1 | 4/2010 | Eckardt, III et al. | |
| 2010/0122164 A1 | 5/2010 | Kay et al. | |
| 2010/0174529 A1 | 7/2010 | Bradford et al. | |
| 2011/0010174 A1 | 1/2011 | Long et al. | |
| 2011/0106743 A1 | 5/2011 | Duchon | |
| 2012/0174035 A1 | 7/2012 | Baker et al. | |
| 2013/0065204 A1 | 3/2013 | LoStracco et al. | |
| 2013/0194191 A1 | 8/2013 | Bradford et al. | |
| 2013/0212098 A1 | 8/2013 | Gallivan | |
| 2014/0111689 A1 | 4/2014 | Kim et al. | |

OTHER PUBLICATIONS

International Search Report and Written Opinion for PCT/US2013/052217 dated Nov. 1, 2013.

U.S. Office Action mailed Sep. 12, 2014 for corresponding to U.S. Appl. No. 13/827,156.

U.S. Notice of Allowance for corresponding U.S. Appl. No. 13/827,937 mailed Jul. 8, 2015.

U.S. Office Action for corresponding U.S. Appl. No. 14/416,017 mailed Jul. 21, 2015.

U.S. Office Action for corresponding U.S. Appl. No. 13/826,661 mailed Jul. 8, 2015.

U.S. Office Action for corresponding U.S. Appl. No. 14/416,023 mailed Jul. 13, 2015.

U.S. Notice of Allowance for corresponding U.S. Appl. No. 13/827,156 mailed Aug. 3, 2015.

* cited by examiner

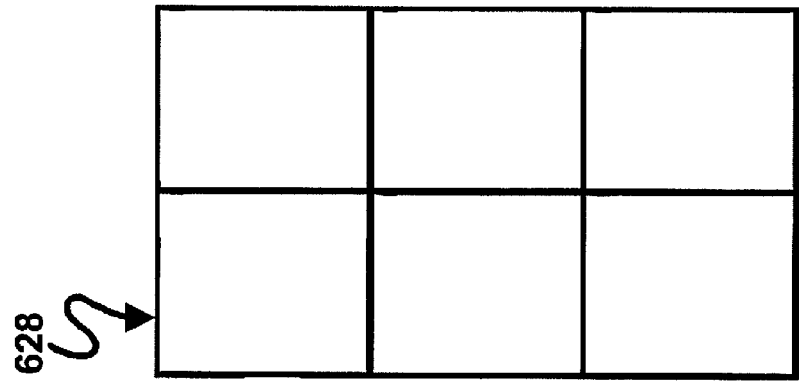
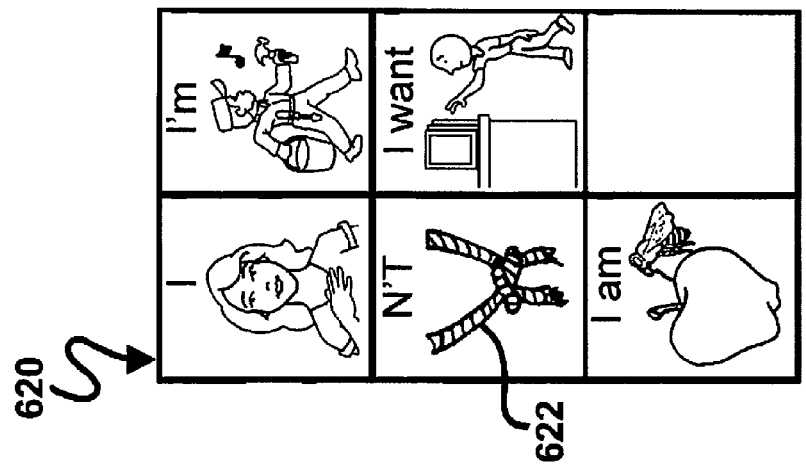
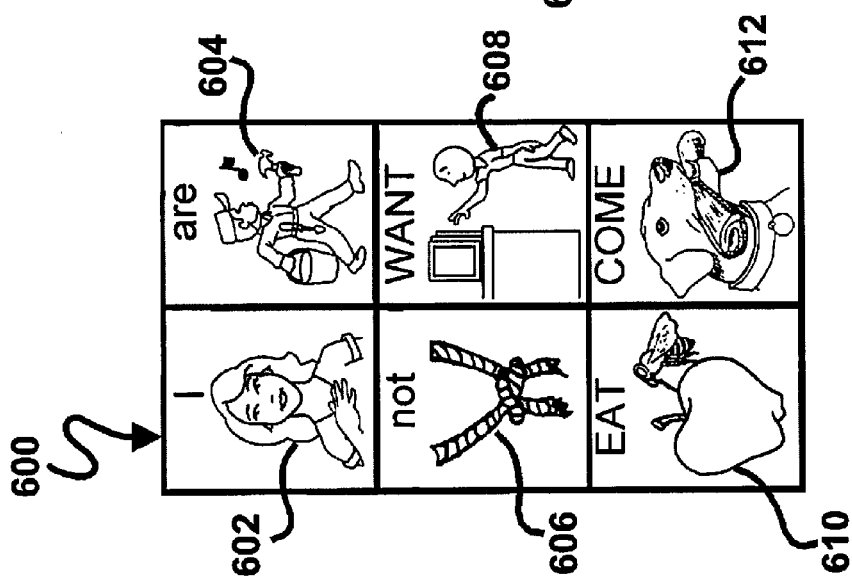

SYSTEM AND METHOD FOR EFFECTIVELY NAVIGATING POLYSEMOUS SYMBOLS ACROSS A PLURALITY OF LINKED ELECTRONIC SCREEN OVERLAYS

PRIORITY STATEMENT

The present application hereby claims priority under 35 U.S.C. §119(e) to U.S. provisional patent application No. 61/676,491 filed Jul. 27, 2012, the entire contents of which are hereby incorporated herein by reference.

FIELD

The present application generally relates to a system and method using polysemous (multi-meaning) symbols.

BACKGROUND

A system and method for producing synthetic single or plural word messages was developed by Bruce Baker et al. and is disclosed in U.S. Pat. No. 4,661,916 to Baker et al. (the Baker '916 patent) issued on Apr. 28, 1987, the entire contents of which are hereby incorporated herein by reference. The system was directed to a linguistic coding system and keyboard for use by people with cognitive and/or physical impairments. The coding system and associated keyboard was used to store and access messages, which included words, plural word messages, phonemes, sentences, phrases, full names, letters, numbers, functions, or any combination thereof.

In such a system, the keyboard was coupled to a computer device, or was alternately part of the stand-alone entity which included a microprocessor, memory and display. The memory stored the messages for selective retrieval by the keyboard. The messages retrieved from the keyboard were then fed to a voice synthesizer, for example, which converted them through a loudspeaker to produce audible spoken messages. On this keyboard, associated with each of a plurality of keys, were polysemous (multi-meaning) symbols, also known as icons. By designating selected ones of the keys and their associated symbols or icons, selected stored messages or plural word messages (including but not limited to words, phrases and sentences) were accessed from the memory and then subsequently output.

With the system described in the Baker '916 patent, messages stored in the memory could be retrieved by activating a combination of symbol keys and other keys to vary the context of the polysemous symbols. Thus, a plurality of sentences could be selectively generated as a function of polysemous symbols in combination with other polysemous symbols. This allowed a user the ability to access thousands of words or messages based upon as little as one, two, or three keystrokes. Further, with symbols being polysemous, thousands of symbol sequences could be generated with only a small number of keys on a keyboard. Based upon ease of use of the system, the polysemous icons or symbols utilized, and the easily memorized symbol sequence combinations, such a system became ideal for many mentally and physically challenged users for whom spelling and typing, as well as speech itself, was extremely difficult.

The system of the Baker '916 patent allowed for an operator to go directly from thought to speech. This was possible because each key of the keyboard bore a central image or symbol which was polysemous and illustrated an important aspect of life and/or linguistic function. The keyboards could be varied depending on the intellectual level of the intended operator. Therefore, each keyboard could in itself be a language which was designed for or with a specific user.

Each of the polysemous symbols was developed to be rich in associations so that combinations of symbols could signal sentence or message ideas in the operator's memory. This enabled the generation of plural word or whole sentence messages by the activation of only a limited number of keys. The device allowed for the generation of many sentences or phrases and a large core vocabulary which could be easily retrieved from memory because of the ease with which the polysemous symbols on the keys portrayed the production of whole thoughts.

In the aforementioned system of the Baker '916 patent, the spatial configuration of the symbols on a given keyboard remained constant. Sequences of symbols in fixed places were consistent, allowing messages to be reliably produced with the same sequence each time. This constant mapping supported the learning of motor patterns associated with symbol sequences. As such sequences were learned, the user could establish motor programs that allow sequences to be produced quickly and accurately in the same way a touch typist efficiently spelled many words or a musician played an instrument.

The aforementioned Baker '916 patent provided an excellent means of accessing high frequency "core" vocabulary words using sequenced polysemous symbols. However, the system of the Baker '916 patent only provided limited access to the relatively large set of low frequency "fringe" vocabulary words that would only be used periodically.

A subsequent design that provided for a way to easily access fringe vocabulary utilizing non-polysemous symbols on dynamic graphical screens was disclosed in U.S. Pat. No. 5,920,303 to Baker et al. (the Baker '303 patent) issued Jul. 6, 1999, the entire contents of which are hereby incorporated herein by reference. In the system of the aforementioned Baker '303 patent, non-polysemous symbols were used for accessing fringe vocabulary. In the system of the Baker '303 patent, less than all of a plurality of keys on the displayed keyboard were dynamically redefined in response to selection of a symbol or sequentially selected symbols. These dynamic characteristics produced a dynamically redefined keyboard for accessing fringe vocabulary.

Even though the system of the aforementioned Baker '303 patent provided an improved method for accessing fringe vocabulary, it could still be limited in that it could not provide efficient access to a very large set of fringe vocabulary words. The fringe vocabularies of adolescents or adults may include many thousand words that are used on occasion in specific contexts. For example, most vocabulary words that are learned in academic or vocational settings are fringe vocabulary words related to specific topics. In the system of the Baker '303 patent, a subset of the plurality of keys on the displayed keyboard could contain dynamically re-defined non-polysemous symbols for selection of fringe vocabulary. In some embodiments, this subset of keys on the displayed keyboard may include one row of twelve keys, which may be used to access fifty different fringe words, for example. In this case, the operator may need to use command keys to browse through a set of non-polysemous symbols that is much larger than the number of available key locations. A control key may be used to dynamically redefine this subset of keys multiple times until the desired symbol is presented. In the system of the aforementioned Baker '303 patent, the operator may need to execute six or more keystrokes to access a desired fringe vocabulary word corresponding to one of a large number of non-polysemous symbols.

Although many people have learned to successfully use augmentative and alternative communication systems containing embodiments of the semantic compaction encoding techniques to communicate with very high levels of linguistic performance, some populations of children have had difficulty learning more advanced systems where the available language is effectively unlimited. Children with autism, in particular, may be overwhelmed by a large array of unfamiliar polysemous symbols and potential polysemous symbol sequences. Alternatively, they may perseverate on one symbol while a clinician is trying to provide structured instructional activities involving sequences associated with a different polysemous symbol.

The Baker '916 patent provided for embodiments that include a keyboard with a relatively large number of polysemous symbols suitable for individuals with relatively high cognitive and linguistic skills, and embodiments that included a keyboard with a relatively small number of polysemous symbols suitable for individuals with more significant cognitive or linguistic impairments. An individual who has difficulty learning the system may benefit from a system with a simpler keyboard, but this consequently limits the availability of stored language content.

U.S. Pat. No. 5,297,041 issued Mar. 22, 1994 (the Kushler '041 patent), the entire contents of which are hereby incorporated herein by reference, provided for a predictive input system which only allowed an operator to select a polysemous symbol that would lead to the valid production of a sequence for accessing a previously stored message after, an initial polysemous symbol has been selected (or even prior to selection). The subsequent Baker '303 patent provided for a dynamically re-defined keyboard, where individual keys were dynamically re-definable after one or more initial polysemous symbols were selected to provide additional visual information about potential words or messages that may be produced by selecting one or more additional symbols. Such systems may support access to thousands of stored words or messages through selection of unique sequences of polysemous symbols, and provide feedback in relation to available sequences. Although these systems may store enough content to support selective generation of numerous unique sentences with a relatively small number of polysemous symbols, all valid polysemous symbol sequences and corresponding stored words and messages are accessible to the user at all times. Thus, access to the stored language content was effectively unlimited.

In the system of the Baker '916 patent, the communication device included a keyboard coupled to a microprocessor associated with an electrical programmable read only memory. Each key of the keyboards included a relatively centrally disposed polysemous symbol, and all keys were permanently displayed in a static configuration. A given pre-stored message including one or more words, for example, could be retrieved from the electrical programmable read-only memory by actuating a specific sequence of keys that included polysemous symbols, where the key sequence was associated with the given pre-stored message.

The systems of several subsequent patents improved on the design disclosed in the Baker '916 patent while consistently maintaining a requirement that pre-stored messages be retrieved from an electronic memory via actuation of a corresponding symbol sequence using a single keyboard or keyboard overlay. The system developed by Baker, et al, and disclosed in U.S. Pat. No. 5,210,689 to Baker, et al, (the Baker '689 patent) issued on May 11, 1993, the entire contents of which are hereby incorporated herein by reference, provided for a continuous input system that allowed a user utilizing an icon or symbol mode to access stored morphemes, words, phrases, or sentences by selecting sequences of polysemous icon symbols and allowed a user utilizing a character, word prediction, or suffix mode to enter additional content using a text-based keyboard. In the system of the Baker '689 patent, the keyboards for the symbol mode and character, word prediction or suffix mode overlapped in space so that a user could automatically toggle between modes on a single keyboard without having to manually switch between modes.

The system disclosed in U.S. Pat. No. 5,920,303, issued to Baker, et al on Jul. 6, 1999 provided for a dynamic keyboard on a graphical user interface including a plurality of keys with associated symbols that are dynamically redefinable to provide access to higher level keyboards. In this system, keys could be dynamically redefined based on one or more initially selected symbols in a sequence such that symbols on dynamically redefined keys could include embellished symbols and/or newly displayed symbols. This system also allowed for easy access to core vocabulary words through selection of sequenced polysemous symbols while providing improved access to fringe vocabulary words via selection of the new or embellished symbols corresponding to fringe vocabulary words.

In the systems of the above-mentioned patents, and other patents subsequent to the Baker '916 patent, sequenced polysemous symbols were selected from a keyboard to retrieve associated stored messages from an electronic memory. Where features of the keyboard have been dynamically redefined based on one or more initially selected polysemous symbols in a sequence, those dynamically redefinable features were limited to changes in individual keys or symbols.

An alternative to the polysemous symbols disclosed in the Baker '916 patent and subsequent patents involves the use of solely non-polysemous (single meaning) symbols. When solely non-polysemous symbols are used, a small number of non-polysemous symbols, for example 20 symbols in a four by five array, are initially introduced. Selection of one of these non-polysemous symbols is typically used to produce a stored message, such as a noun that is easy to represent with pictures of a pre-stored sentence. At this point, solely non-polysemous symbols may be used easily, and with minimal effort.

Use of solely non-polysemous symbols becomes much more challenging, however, when the number of available stored vocabulary words and sentences exceeds the number of available locations on the display of the communication device; when this happens, the set of non-polysemous symbols and associated stored messages must be sorted and divided across a plurality of linked pages, and the operator must navigate between these pages to locate and select desired messages. Typically, many of the non-polysemous symbols on the highest level "master" page include links to additional pages of non-polysemous symbols. These additional pages may contain non-polysemous symbols that include links to even more pages, a link back to the master page, and/or some non-polysemous symbols that are associated with stored messages.

The words on these various pages are often organized into semantic categories. In these systems, selecting a non-polysemous symbol on the master page that represents a superordinate semantic category links the operator to a second page containing non-polysemous symbols associated with category members and/or subordinate categories. On the second page, selecting a non-polysemous symbol associated with a subordinate category activates a link to a third page containing additional non-polysemous symbols, and so on. Selecting a non-polysemous symbol associated with a category member generates the associated stored message.

As an example, the master page on a communication device may have non-polysemous symbols linking to the categories "people," "food," "school", "fun times," and "clothing." Selecting the non-polysemous symbols that includes a link to the "clothing" category may link to a page containing non-polysemous symbols associated with the category members "shirt," "pants," "underwear," and "shoes," as well as non-polysemous symbols that include links to the subordinate categories "winter clothing," "summer clothing," and "formal clothing," and a non-polysemous symbol including a link back to the master page.

As the vocabulary increases in size, the number of pages of non-polysemous symbols on such a system must necessarily increase, which in turn increases the cognitive complexity of tasks involved in using the system. In order to produce any given word, the operator must recall the categorical organization of the system well enough to identify the superordinate and subordinate categories that must be linked in order to navigate to the page containing the desired word, and visually search for each symbol that should be selected during navigation.

For example, the operator may recall that "coat" is located under the superordinate category for clothing, and still not be sure whether "coat" is located under the subordinate category for "winter clothing" or "formal clothing." This becomes a recurrent problem when navigating many pages. In order to store a 1,000 word vocabulary, consistent with that of a typically developing three-year-old, a minimum of 56 linked 20-location pages of non-polysemous symbols are required. When an operator must navigate such an extensive set of categorically organized pages, actual communication using the system may be very limited because the cognitive demands of page navigation are so extensive.

Recent developments in broadly available consumer technologies have included tablets, smart phones, and other portable multifunction devices with touch-screen interfaces, such as iPADs, iPhones, and Android devices. These devices have allowed programmers to develop and implement a wide range of third-party application programs, including assistive technology programs, as long as the program was compatible with the device hardware and the software platform that was integral to the device's operating system. The software platforms on portable multifunction devices were highly compatible with a wide range of third-party augmentative and alternative communication programs containing numerous pages of non-polysemous symbols, but were not necessarily as compatible with established embodiments of the Baker '916 patent or subsequent patents using polysemous symbol systems.

Previous embodiments of the Baker '916 patent and the subsequent patents have relied on a method of retrieving stored messages from an electronic memory when a corresponding symbol sequence is selected on a keyboard. This process could have involved a large and complex computer program with over a million lines of code and a database defining the interactions between the various polysemous or non-polysemous symbols, words, and speech. Modifying such a program to be elegantly and efficiently transferred between a plurality of operating systems on tablet, smart phone, and other portable multifunction devices may have been very difficult or even impossible.

SUMMARY

The inventors recognize that an augmentative communication program involving the implementation of a series of linked electronic screen overlays may be a more elegant and concise program to allow for relatively efficient programming adaptations to transfer the program between various devices and operating systems.

At least one embodiment of the present invention is generally directed to a system (such as an AAC system for example) and/or method including an application program utilizing sequenced polysemous symbols to access messages. Note that throughout the embodiments of the application, the word "message" or "messages" is used to mean any of words, plural word messages, phonemes, morphemes, sentences, phrases, full names, letters, numbers, functions, commands or any combination thereof.

At least one embodiment of the system and method may be directed to at least one of:

Implementing a system, method and/or an application program that may be adapted to a plurality of consumer devices, including tablets, smart phones and/or other devices computer processors, touch screen interfaces, memory and/or a plurality of different operating systems; and/or using sequenced multi-meaning symbols in such a system, method and/or application program.

Implementing an internally consistent application program, system and/or method of sequentially linked electronic screen overlays that are effectively navigable using sequenced polysemous symbols.

Providing an application program, system and/or method for accessing categorically organized fringe vocabulary with fewer keystrokes using sequences of polysemous and non-polysemous symbols on sequentially linked electronic screen overlays. For example, this can include an application program, system and/or method for accessing categorically organized fringe vocabulary using a symbol sequence beginning with at least one multi-meaning symbol, followed by a single meaning symbol on an activity row that corresponds to a category of fringe vocabulary words. Triggering a single meaning symbol on the activity row that corresponds to a category may then trigger a display of a screen of keys used to produce fringe vocabulary words that are category members.

At least one embodiment of the present application is directed to a method comprising: providing polysemous symbols for selection on an initial electronic screen overlay displayed on a display; storing, in a memory, a plurality of the selectable polysemous symbols in association with a pointer identifying display of an electronic screen overlay which is different from the initial electronic screen overlay; and displaying a second electronic screen overlay on the display, in response to initial selection of one of the provided polysemous symbols, the second electronic screen overlay being the electronic screen overlay associated with the selected polysemous symbol. The second electronic screen overlay may be displayed in place of the initial electronic screen overlay.

At least one embodiment of the present application is directed to article of manufacture, comprising: a first code segment for causing a computer device to provide polysemous symbols for selection on an initial electronic screen overlay displayed on a display; a second code segment for causing the computer device to store, in a memory, a plurality of the selectable polysemous symbols in association with a pointer identifying display of an electronic screen overlay which is different from the initial electronic screen overlay; and a third code segment for causing the computer device to display a second electronic screen overlay on the display, in response to initial selection of one of the provided polysemous symbols, the second electronic screen overlay being the electronic screen overlay associated with the selected polysemous symbol.

At least one embodiment of the present application is directed to an apparatus comprising: an integrated input and display device configured to provide displayed polysemous symbols for selection on an initial electronic screen overlay; and a memory configured to store a plurality of the selectable polysemous symbols in association with a pointer identifying display of an electronic screen overlay which is different from the initial electronic screen overlay, the integrated input and display device being configured to display a second electronic screen overlay, in response to selection of one of the provided polysemous symbols, the second electronic screen overlay being associated with the selected polysemous symbol.

At least one embodiment of the present application is directed to a method, comprising: displaying, on a display, a virtual keyboard including a plurality of polysemous symbols for selection on an initial electronic screen overlay; storing, in a memory, a plurality of the selectable polysemous symbols in association with a pointer identifying display of an electronic screen overlay which is different from the initial electronic screen overlay; displaying a second electronic screen overlay on the display, in response to initial selection of one of the provided polysemous symbols, the second electronic screen overlay being the electronic screen overlay associated with the selected polysemous symbol and including a virtual keyboard wherein less than all of a plurality of key locations on the virtual keyboard include a non-polysemous symbol; and outputting at least one of a word, sentence, phoneme, message, letter, number, morpheme, command and phrase and displaying the initial electronic screen overlay in place of the second electronic screen overlay, in response to selection of one of the non-polysemous symbols.

At least one embodiment of the present application is directed to an apparatus, comprising: an integrated input and display configured to display a virtual keyboard including a plurality of polysemous symbols for selection on an initial electronic screen overlay; a memory, configured to store a plurality of the selectable polysemous symbols in association with a pointer identifying display of an electronic screen overlay which is different from the initial electronic screen overlay; a processor configured to determine initial selection of one of the provided polysemous symbols, and configured to control the display of a second electronic screen overlay on the integrated input and display, in response to the determined initial selection, the second electronic screen overlay being the electronic screen overlay associated with the selected polysemous symbol and including a virtual keyboard wherein less than all of a plurality of key location on the virtual keyboard include a non-polysemous symbol; and an output device configured to output at least one of a word, sentence, phoneme, message, letter, number, morpheme, command and phrase in response to selection of one of the non-polysemous symbols, the integrated input and display device being further configured to display the initial electronic screen overlay in place of the second electronic screen overlay, in response to selection of one of the non-polysemous symbols.

At least one embodiment of the present application is directed to an article of manufacture, comprising: a first code segment for causing a computer device to display, on a display, a virtual keyboard including a plurality of polysemous symbols for selection on an initial electronic screen overlay; a second code segment for causing the computer device to store, in a memory, a plurality of the selectable polysemous symbols in association with a pointer identifying display of an electronic screen overlay which is different from the initial electronic screen overlay; a third code segment for causing the computer device to displaying a second electronic screen overlay on the display, in response to initial selection of one of the provided polysemous symbols, the second electronic screen overlay being the electronic screen overlay associated with the selected polysemous symbol and including a virtual keyboard wherein less than all of a plurality of key location on the virtual keyboard include a non-polysemous symbol; and a fourth code segment for causing the computer device to outputting at least one of a word, sentence, phoneme, message, letter, number, morpheme, command and phrase and displaying the initial electronic screen overlay in place of the second electronic screen overlay, in response to selection of one of the non-polysemous symbols.

At least one embodiment of the present application is directed to a method, comprising: displaying, on a display, a virtual keyboard including a plurality of polysemous symbols for selection on an initial electronic screen overlay; storing, in a memory, a plurality of the selectable polysemous symbols in association with a pointer identifying display of an electronic screen overlay which is different from the initial electronic screen overlay; displaying a second electronic screen overlay on the display, in response to initial selection of one of the provided polysemous symbols, the second electronic screen overlay being the electronic screen overlay associated with the selected polysemous symbol and including a virtual keyboard wherein less than all of a plurality of key location on the virtual keyboard include a non-polysemous symbol; and displaying a third electronic screen overlay on the display in place of the second electronic screen overlay, in response to selection of one of the non-polysemous symbols.

At least one embodiment of the present application is directed to an apparatus, comprising: an integrated input and display configured to display a virtual keyboard including a plurality of polysemous symbols for selection on an initial electronic screen overlay; a memory, configured to store a plurality of the selectable polysemous symbols in association with a pointer identifying display of an electronic screen overlay which is different from the initial electronic screen overlay; and a processor configured to determine initial selection of one of the provided polysemous symbols, and configured to control the display of a second electronic screen overlay on the integrated input and display, in response to the determined initial selection, the second electronic screen overlay being the electronic screen overlay associated with the selected polysemous symbol and including a virtual keyboard wherein less than all of a plurality of key location on the virtual keyboard include a non-polysemous symbol, the integrated input and display device being further configured to display a third electronic screen overlay on the display in place of the second electronic screen overlay, in response to the processor determining selection of one of the non-polysemous symbols.

At least one embodiment of the present application is directed to an article of manufacture, comprising: a first code segment for causing a computer device to display, on a display, a virtual keyboard including a plurality of polysemous symbols for selection on an initial electronic screen overlay; a second code segment for causing the computer device to store, in a memory, a plurality of the selectable polysemous symbols in association with a pointer identifying display of an electronic screen overlay which is different from the initial electronic screen overlay; a third code segment for causing the computer device to display a second electronic screen overlay on the display, in response to initial selection of one of the provided polysemous symbols, the second electronic screen overlay being the electronic screen overlay associated with the selected polysemous symbol and including a virtual keyboard wherein less than all of a plurality of key location on the virtual keyboard include a non-polysemous symbol; and a fourth code segment for causing the computer device to display a third electronic screen overlay on the display in place of the second electronic screen overlay, in response to selection of one of the non-polysemous symbols.

Figure 1:
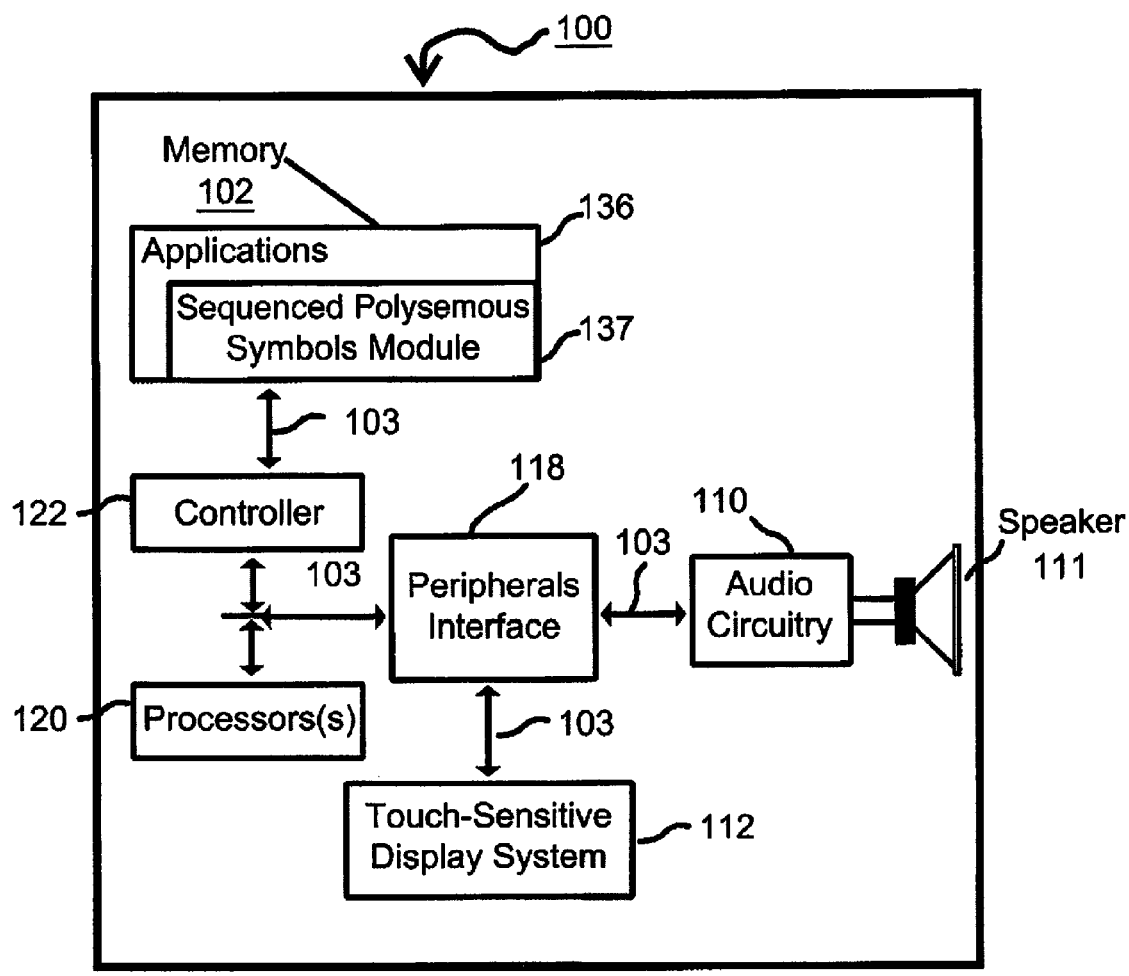
FIG. 1 is a block diagram illustrating components of an example portable multifunction device with a touch-sensitive display.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION OF EXAMPLE EMBODIMENTS

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

Before discussing example embodiments in more detail, it is noted that some example embodiments are described as processes or methods. Although the processes describe the operations as sequential processes, many of the operations may be performed in parallel, concurrently or simultaneously. In addition, the order of operations may be re-arranged. The processes may be terminated when their operations are completed, but may also have additional steps not included. The processes may correspond to methods, functions, procedures, subroutines, subprograms, etc.

Methods discussed below may be implemented by hardware, software, firmware, middleware, microcode, hardware description languages, or any combination thereof. When implemented in software, firmware, middleware or microcode, the program code or code segments to perform the necessary tasks will be stored in a machine or computer readable medium such as a storage medium or non-transitory computer readable medium. A processor(s) will perform the necessary tasks.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments may be described with reference to acts and symbolic representations of operations that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

Note also that the software implemented aspects of the example embodiments may be typically encoded on some form of program storage medium or implemented over some type of transmission medium. The program storage medium (e.g., non-transitory storage medium) may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

Embodiments of a portable multifunction device, user interfaces for such devices, and associated processes for using such devices are described herein. In some embodiments, the portable multifunction device is a portable communications device such as a mobile telephone that also contains other functions, such as PDA and/or music player functions. It should be noted that the portable multifunction device described hereafter is an example of a device capable of performing the methodology provided in the present application and discussed in detail hereafter, and that the methodologies of the embodiments of the present application can be performed on the hereafter discussed portable multifunction device, but are not necessarily limited thereto.

The portable multifunction device may support a variety of application programs or applications, such as a telephone application, a video conferencing application, an e-mail application, an instant messaging application, a blogging application, a digital camera application, a digital video camera application, a web browsing application, a digital music player application, and/or a digital video player application.

The various applications that may be executed on the portable multifunction device may use at least one common physical user-interface device, such as the touch screen. One or more functions of the touch screen as well as corresponding information displayed on the portable multifunction device may be adjusted and/or varied from one application to the next and/or within a respective application. In this way, a common physical architecture (such as the touch screen) of the portable multifunction device may support the variety of applications with user interfaces that are intuitive and transparent.

The user interfaces may include one or more soft keyboard embodiments. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the portable device may utilize common and/or different keyboard embodiments. Thus, the keyboard embodiment used may be tailored to at least some of the applications. In some embodiments, one or more keyboard embodiments may be tailored to a respective user. For example, based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

FIG. 1 is a block diagram illustrating an example embodiment of a portable multifunction device 100 with a touch-sensitive display 112. The touch-sensitive display 112 is sometimes referred to herein as a "touch screen", "touch panel" "integrated input and display device", or "display system 112" for convenience. The portable multifunction device 100 may include a memory 102 (which may include one or more computer readable storage mediums for example), a memory controller 122, one or more computer processing units (CPU's, sometimes referred to herein as a "processor" or "controller" for convenience) 120. These components may communicate over one or more communication buses or signal lines 103.

It should be appreciated that the portable multifunction device 100 is only one example of a portable multifunction device, and that the portable multifunction device supporting various embodiments of the present application described hereafter may have more or fewer components than shown, may combine two or more components, or a may have a different configuration or arrangement of the components, etc.

The touch-sensitive display system 112 provides an input interface and an output interface between the portable multifunction device 100 and a user (hence the previous reference to integrated input and display device). The touch-sensitive display system 112 displays visual output to the user. The visual output may include for example, graphics, text, icons, video, and any combination thereof (collectively termed "graphics"). Additional outputs can be that of, for example, a printer (not shown), an audible output via a speaker 111 and audio circuitry 110, and/or other output devices. Peripheral interfaces 118 can be included between the processor(s) 120/controller 122 and the output devices (touch-sensitive display system 112, and audio circuitry 110/speaker 111).

The touch screen in the touch-sensitive display system 112 may use LCD (liquid crystal display) technology, or LPD (light emitting polymer display) technology, although other display technologies may be used in the embodiments of the invention as well, and is not limited as such.

In some embodiments, in addition to the touch screen in the touch-sensitive display system 112, the portable multifunction device 100 may include a touchpad (not shown) for activating or deactivating particular functions. In some embodiments, the touchpad may be a touch-sensitive area of the device that, unlike the touch screen, does not display visual output. The touchpad may be a touch-sensitive surface that is separate from the touch screen in the touch-sensitive display system 112 or an extension of the touch-sensitive surface formed by the touch screen. Further, other types of known input devices (keyboard, mouse, microphone, etc.) and/or output devices (speaker, printer, etc.) may also be integrated therein/connected thereto.

Application programs 136 of embodiments of the present application, utilizing sequenced polysemous symbols to access messages (sequenced polysemous symbols module 137), can also be stored in memory 102. Such application programs 136 of various embodiments of the present application, as will be discussed hereafter can be implemented on the portable multifunction device 100 and/or can implement the methods discussed above and hereafter.

Figure 2:
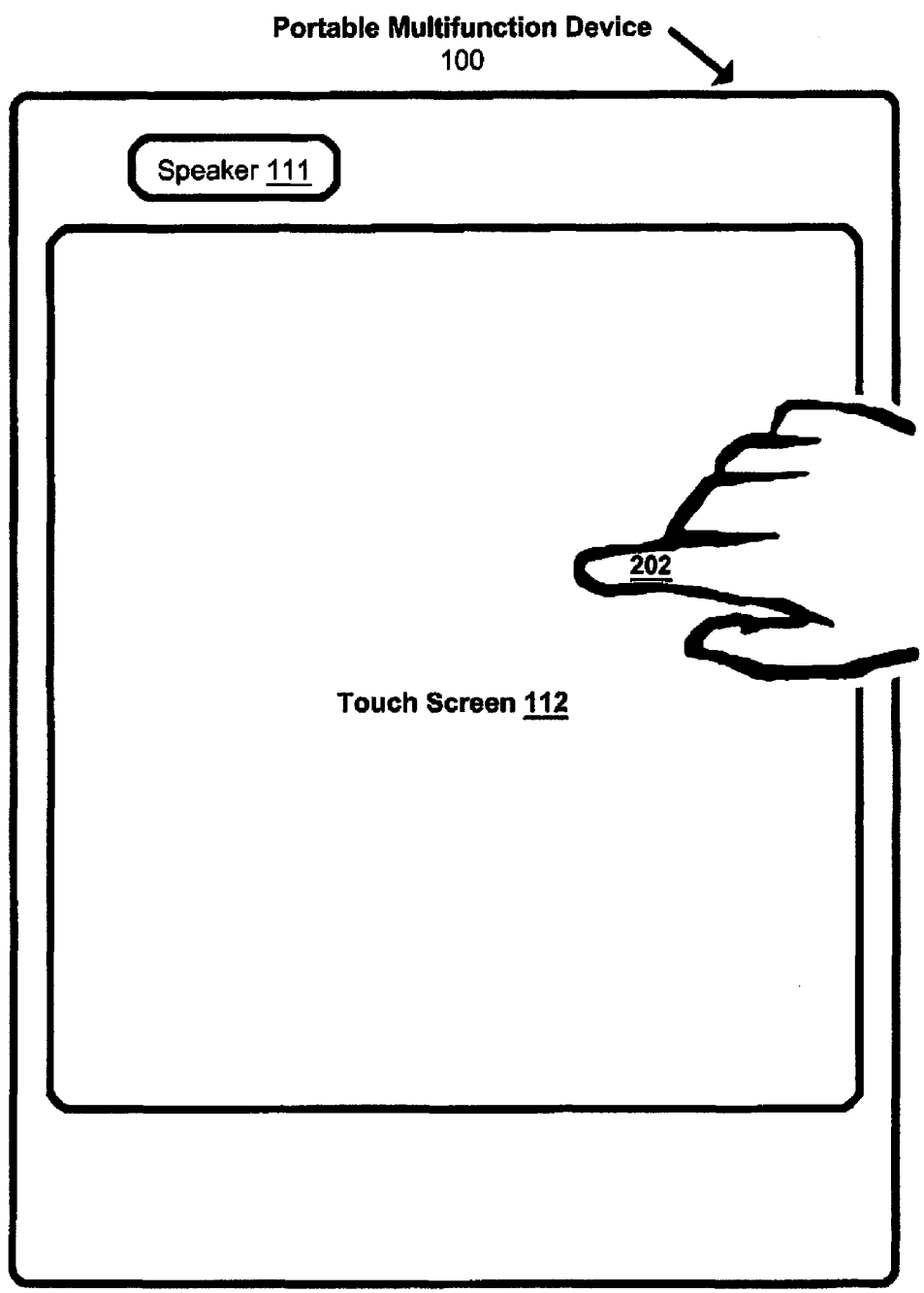
FIG. 2 illustrates an example portable multifunction device having a touch sensitive display.

FIG. 2 illustrates a portable multifunction device 100 having a touch screen 112 in accordance with some embodiments. The touch screen 112 may display one or more graphics. These graphics can include symbols, icons, text, a virtual keyboard with virtual keys, etc., such as those described in the embodiments hereafter. In an embodiment, as well as others described below, a user may select one or more of the graphics by making contact or touching the graphics, for example, with one or more fingers 202 (not drawn to scale in the figure).

It should be noted that the apparatus described above with reference to FIGS. 1 and 2 references a general description of hardware for an apparatus described hereafter regarding embodiments of the present application, as well as a general description of hardware for an apparatus to implement the methods and programs described below regarding embodiments of the invention.

At least one embodiment of the present application is directed to a method comprising: providing polysemous symbols for selection on an initial electronic screen overlay displayed on a display; storing, in a memory, a plurality of the selectable polysemous symbols in association with a pointer identifying display of an electronic screen overlay which is different from the initial electronic screen overlay; and displaying a second electronic screen overlay on the display, in response to initial selection of one of the provided polysemous symbols, the second electronic screen overlay being the electronic screen overlay associated with the selected polysemous symbol. The second electronic screen overlay may be displayed in place of the initial electronic screen overlay.

The method may further include receiving via a processor, an indication of selection of the one of the provided polysemous symbols; and controlling, via the processor, the display to display the second electronic screen overlay associated with the selected polysemous symbol upon the processor receiving the indication of selection.

The method may further include receiving via a processor, an indication of selection of the one of the provided polysemous symbols; and controlling, via the processor, the display to display the second electronic screen overlay associated with the selected polysemous symbol in place of the initial electronic screen overlay upon the processor receiving the indication of selection.

The method may further include outputting at least one of a word, sentence, phoneme, message, letter, number, morpheme, command and phrase in response to selection of one of the provided symbols on the displayed second electronic screen overlay, the output at least one of a word, sentence, phoneme, message, letter, number, morpheme, command and phrase being stored in the memory in association with a symbol sequence including the initially selected polysemous symbol and the selected one of the provided symbols on the displayed second electronic screen overlay.

The method may further include receiving, via the processor, an indication of selection of one of the provided symbols on the displayed second electronic screen overlay; and controlling, via the processor, output of at least one of a word, sentence, phoneme, message, letter, number, morpheme, command and phrase in response the processor receiving an indication of selection of one of the provided symbols on the displayed second electronic screen overlay, the output at least one of a word, sentence, phoneme, message, letter, number, morpheme, command and phrase being stored in the memory in association with a symbol sequence including the initially selected polysemous symbol and the selected one of the provided symbols on the displayed second electronic screen overlay.

The method may further include storing a plurality of the selectable polysemous symbols, displayed on the second electronic screen overlay, in association with a pointer identifying display of third electronic screen overlay which is different from the second electronic screen overlay; and displaying a third electronic screen overlay on the display, in response to selection of one of the selectable polysemous symbols of the displayed second electronic screen overlay, the third electronic screen overlay being associated with the selected one of the polysemous symbols of the displayed second electronic screen overlay.

The third electronic screen overlay may be displayed in place of the second electronic screen overlay.

The method may further include receiving via a processor, an indication of selection of the one of the polysemous symbols displayed on the second electronic screen overlay; and controlling, via the processor, the display to display the third electronic screen overlay associated with the selected one of the polysemous symbols displayed on the second electronic screen overlay upon the processor receiving the indication of selection.

The method may further include outputting at least one of a word, sentence, phoneme, message, letter, number, morpheme, command and phrase in response to selection of one of the provided symbols on the displayed third electronic screen overlay, the output at least one of a word, sentence, phoneme, message, letter, number, morpheme, command and phrase being stored in the memory in association with a symbol sequence including the initially selected polysemous symbol, the selected one of the provided symbols on the displayed second electronic screen overlay, and the selected one of the provided symbols on the displayed third electronic screen overlay.

The method may further include receiving, via the processor, an indication of selection of one of the provided symbols on the displayed third electronic screen overlay; and controlling, via the processor, output of at least one of a word, sentence, phoneme, message, letter, number, morpheme, command and phrase in response the processor receiving an indication of selection of one of the provided symbols on the displayed third electronic screen overlay, the output at least one of a word, sentence, phoneme, message, letter, number, morpheme, command and phrase being stored in the memory in association with a symbol sequence including the initially selected polysemous symbol, the selected one of the provided symbols on the displayed second electronic screen overlay, and the selected one of the provided symbols on the displayed third electronic screen overlay.

At least one embodiment of the present application is directed to article of manufacture, comprising: a first code segment for causing a computer device to provide polysemous symbols for selection on an initial electronic screen overlay displayed on a display; a second code segment for causing the computer device to store, in a memory, a plurality of the selectable polysemous symbols in association with a pointer identifying display of an electronic screen overlay which is different from the initial electronic screen overlay; and a third code segment for causing the computer device to display a second electronic screen overlay on the display, in response to initial selection of one of the provided polysemous symbols, the second electronic screen overlay being the electronic screen overlay associated with the selected polysemous symbol.

The third code segment may further be for causing the computer device, in response to receiving an indication of selection of one of the provided polysemous symbols, to display the associated electronic screen overlay in place of the initial electronic screen overlay.

The article of manufacture may further include a fourth code segment for causing the computer device to output at least one of a word, sentence, phoneme, message, letter, number, morpheme, command and phrase in response to selection of one of the provided symbols on the displayed second electronic screen overlay, the output at least one of a word, sentence, phoneme, message, letter, number, morpheme, command and phrase being stored in the memory in association with a symbol sequence including the initially selected polysemous symbol and the selected one of the provided symbols on the displayed second electronic screen overlay.

The article of manufacture may further include a fourth code segment for causing the computer device to store a plurality of the selectable polysemous symbols, displayed on the second electronic screen overlay, in association with a pointer identifying display of third electronic screen overlay which is different from the second electronic screen overlay; and a fifth code segment for causing the computer device to display a third electronic screen overlay on the display, in response to selection of one of the selectable polysemous symbols of the displayed second electronic screen overlay, the third electronic screen overlay being associated with the selected one of the polysemous symbols of the displayed second electronic screen overlay.

The fourth code segment may further be for causing the computer device to display the third electronic screen overlay in place of the second electronic screen overlay.

At least one embodiment of the present application is directed to an apparatus comprising: an integrated input and display device configured to provide displayed polysemous symbols for selection on an initial electronic screen overlay; and a memory configured to store a plurality of the selectable polysemous symbols in association with a pointer identifying display of an electronic screen overlay which is different from the initial electronic screen overlay, the integrated input and display device being configured to display a second electronic screen overlay, in response to selection of one of the provided polysemous symbols, the second electronic screen overlay being associated with the selected polysemous symbol.

The second electronic screen overlay displayed on the integrated input and display device may be displayed, in response to receiving an indication of selection of the associated one of the provided polysemous symbols, in place of the initial electronic screen overlay.

The apparatus may further include a processor, configured to receive an indication of selection of the one of the provided polysemous symbols and configured to control the integrated input and display device to display the second electronic screen overlay associated with the selected polysemous symbol upon the processor receiving the indication of selection.

The processor may be further configured to receive an indication of selection of the one of the provided polysemous symbols and to control the display to display the second electronic screen overlay associated with the selected polysemous symbol in place of the initial electronic screen overlay upon the processor receiving the indication of selection.

The apparatus may further include an output device configure to output at least one of a word, sentence, phoneme, message, letter, number, morpheme, command and phrase in response to selection of one of the provided symbols on the displayed second electronic screen overlay, the output at least one of a word, sentence, phoneme, message, letter, number, morpheme, command and phrase being stored in the memory in association with a symbol sequence including the initially selected polysemous symbol and the selected one of the provided symbols on the displayed second electronic screen overlay.

The apparatus may further include a processor, configured to receive an indication of selection of one of the provided symbols on the displayed second electronic screen overlay and configured to control the output of at least one of a word, sentence, phoneme, message, letter, number, morpheme, command and phrase in response the processor receiving an indication of selection of one of the provided symbols on the displayed second electronic screen overlay, the output at least one of a word, sentence, phoneme, message, letter, number, morpheme, command and phrase being stored in the memory in association with a symbol sequence including the initially selected polysemous symbol and the selected one of the provided symbols on the displayed second electronic screen overlay.

The memory may be further configured to store a plurality of the selectable polysemous symbols, displayed on the second electronic screen overlay, in association with a pointer identifying display of third electronic screen overlay which is different from the second electronic screen overlay and wherein the integrated input and display is configured to display a third electronic screen overlay, in response to selection of one of the selectable polysemous symbols of the displayed second electronic screen overlay, the third electronic screen overlay being associated with the selected one of the polysemous symbols of the displayed second electronic screen overlay.

A third electronic screen overlay may be displayed in place of the second electronic screen overlay.

The apparatus may further include a processor, configured to receive an indication of selection of the one of the polysemous symbols displayed on the second electronic screen overlay and configured to control the display to display the third electronic screen overlay associated with the selected one of the polysemous symbols displayed on the second electronic screen overlay upon the processor receiving the indication of selection.

The apparatus may further include an output device configured to output at least one of a word, sentence, phoneme, message, letter, number, morpheme, command and phrase in response to selection of one of the provided symbols on the displayed third electronic screen overlay, the output at least one of a word, sentence, phoneme, message, letter, number, morpheme, command and phrase being stored in the memory in association with a symbol sequence including the initially selected polysemous symbol, the selected one of the provided symbols on the displayed second electronic screen overlay, and the selected one of the provided symbols on the displayed third electronic screen overlay.

The processor may be configured to receive an indication of selection of one of the provided symbols on the displayed third electronic screen overlay and is configured to control output of at least one of a word, sentence, phoneme, message, letter, number, morpheme, command and phrase in response the processor receiving an indication of selection of one of the provided symbols on the displayed third electronic screen overlay, the output at least one of a word, sentence, phoneme, message, letter, number, morpheme, command and phrase being stored in the memory in association with a symbol sequence including the initially selected polysemous symbol, the selected one of the provided symbols on the displayed second electronic screen overlay, and the selected one of the provided symbols on the displayed third electronic screen overlay.

Throughout the embodiments of the present application, when the term message or messages is used, such a word can represent any of a stored letter, word, morpheme, phrase, phoneme, sentence, full name, letter, number, plural word message, function, command or any combination thereof, stored in association with sequenced polysemous symbols.

Application programs of embodiments of the present application described hereafter, utilizing sequenced polysemous symbols to access stored messages, can also be stored in memory 102. Such application programs of various embodiments of the present application as will be discussed hereafter can be implemented on the portable multifunction device 100 discussed above.

At least one embodiment of the present invention is directed towards an application program utilizing sequenced polysemous symbols to access stored messages, on tablet devices such as the portable multifunction device 100 including but not limited to iPADs and Android devices, for example, as well as other computer devices with at least one processor 120, memory 102, integrated input and display device or touch screen display 112, etc. Thus, it should be noted that while hardware relating to the portable multifunction device 100 is described above for implementing the application programs of embodiments of the present application described hereafter in an example manner, the embodiments of the present application are not limited to the portable multifunction device 100 described above and can be implemented on various portable and non-portable computer devices including at least one processor, memory, integrated input and display device, etc.

For example, at least one embodiment of the present invention is directed towards an application program utilizing sequenced polysemous symbols to access stored messages on smaller portable smart phone devices such as iPhone devices, for example.

At least one embodiment of the present invention is directed towards a system, method, article of manufacture and/or an application program utilizing sequenced polysemous symbols to access stored messages on computer devices with touch screen interfaces, as well as other computer devices with at least one processor, memory, touch screen interface, etc.

At least one embodiment of the present invention is directed towards a system, method, article of manufacture and/or an application program utilizing sequenced polysemous symbols to access stored messages with an elegantly structured (internally consistent) database that can be easily and efficiently adapted to establish compatibility with a plurality of operating systems and devices. For example, an embodiment of the present invention may include an application program such as an Sqlite (for example) or other database program that is natively supported by a plurality of software platforms, including mutual compatibility across different platforms.

Figure 3A:
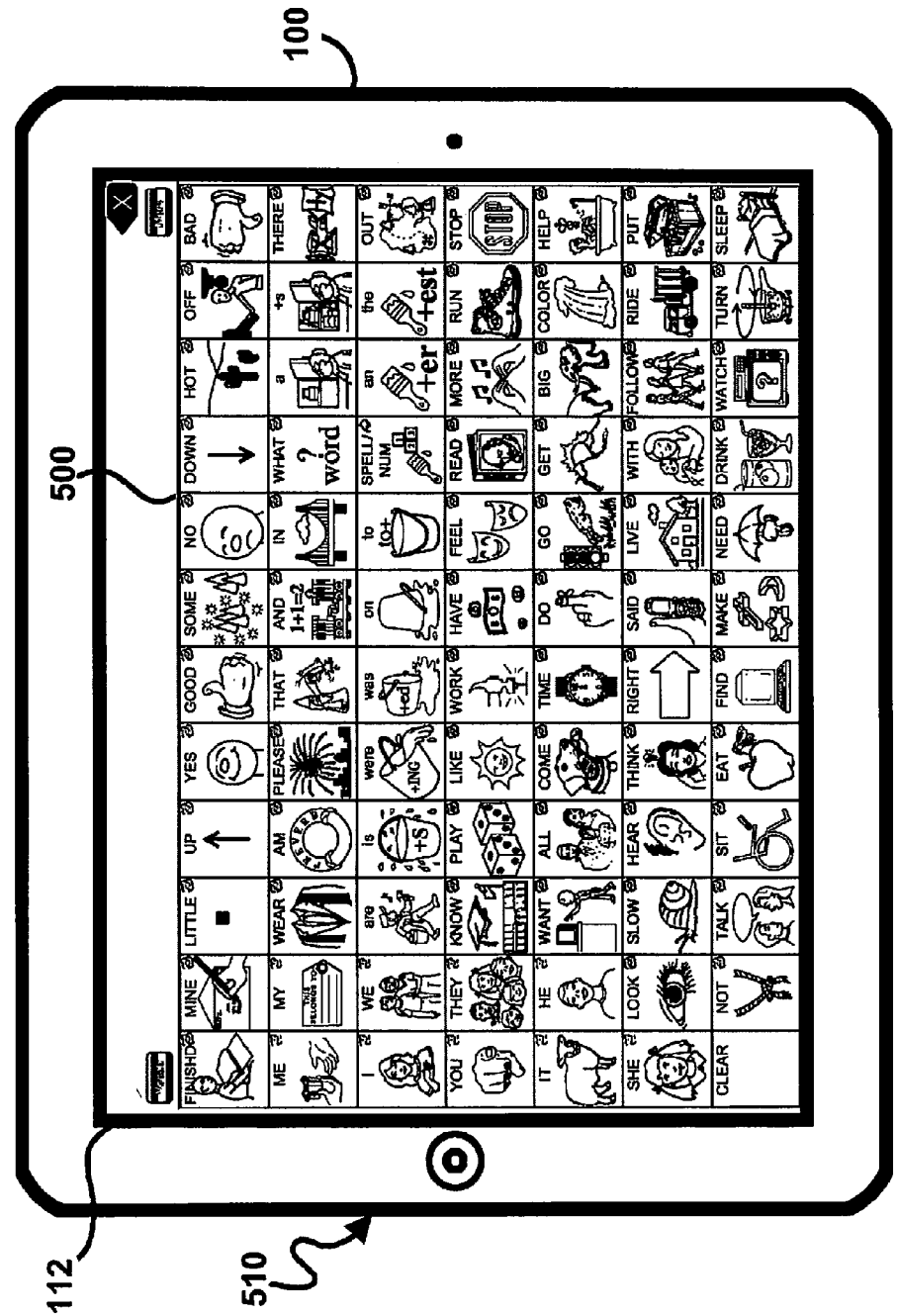
FIG. 3A illustrates an example embodiment of the application program of an embodiment of the present invention running on a portable multifunction device which is a tablet type consumer computer device, including a touch sensitive display.

FIG. 3A illustrates an example embodiment of the application program of an example embodiment of the present invention running on a portable multifunction device 100 which is a tablet type consumer computer device 510, including a touch sensitive display 112. The touch sensitive display 112 includes a plurality of graphic symbols arranged in an initial or first level electronic screen overlay 500. Again, the illustrated structure of FIG. 3A is that of an example embodiment and the embodiments of the present application should not be limited to such a portable multifunction device 100, or even to portable devices.

Figure 3B:
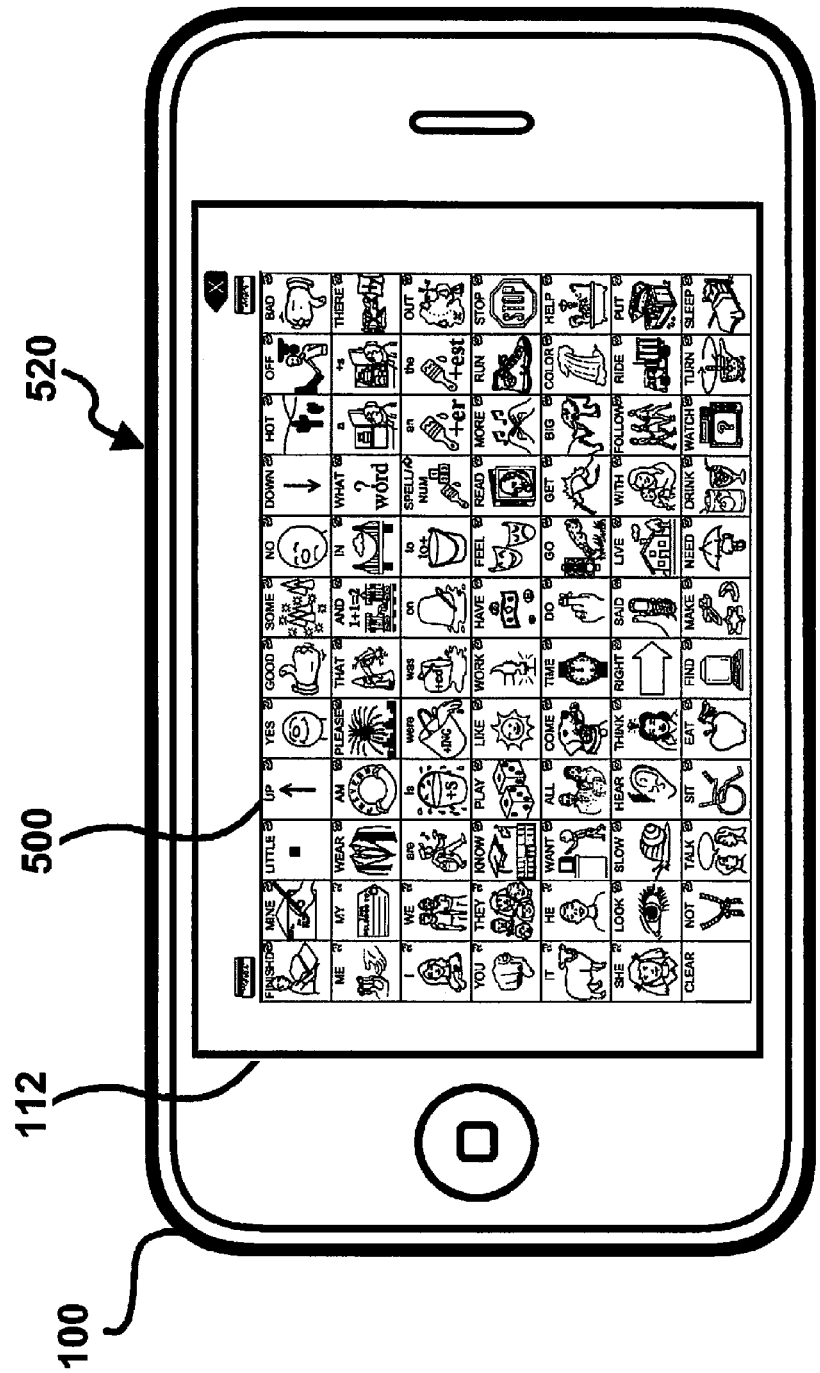
FIG. 3B illustrates an example embodiment of the application program of an embodiment of the present invention running on a portable multifunction device which is a smart phone type consumer device, including a touch sensitive display.

FIG. 3B illustrates an example embodiment of the application program of an example embodiment of the present invention running on a portable multifunction device 100 which is a smart phone type consumer device 520, including a touch sensitive display 112. The touch sensitive display 112 includes a plurality of graphic symbols arranged in an initial or first level electronic screen overlay 500. Again, the illustrated structure of FIG. 3B is that of an example embodiment and the embodiments of the present application should not be limited to such a portable multifunction device 100, or even to portable devices.

Note that FIGS. 3A and 3B are merely non-limiting examples of portable multifunction devices 100 including a graphical touch sensitive display 112 which are encompassed by the embodiments of the present application, used to illustrate a relationship between symbols arranged on an electronic screen overlay 500 and the portable multifunction devices 100 including a graphical touch sensitive display 112. It should be understood that the embodiments of the present application are applicable to any portable or even semi or non-portable multifunction devices including a graphical touch sensitive display capable of displaying electronic screen overlays such as those shown in FIGS. 3A and 3B.

At least one embodiment of the present invention is directed towards a system, method, computer readable medium and/or article of manufacture system, method, computer readable medium and/or article of manufacture for utilizing sequenced polysemous symbols to access stored messages that are stored in a memory among a plurality of linked electronic screen overlays, and which extend linguistic encoding strategies to applications that utilize a plurality of linked electronic screen overlays. Please note that throughout the discussions of the embodiments of the present application hereafter, the word "message" or "plural word messages" can stand for any of a letter, word, morpheme, phrase, phoneme, sentence, full name, letter, number, plural word message, function, command or any combination thereof, stored in association with sequenced polysemous symbols.

At least one embodiment of the present invention includes a plurality of linked electronic screen overlays, each of which displays a virtual keyboard with a plurality of virtual key locations that may include a symbol, such as a relatively centrally disposed symbol for example.

At least one embodiment of the present invention includes a plurality of linked electronic screen overlays, each of which displays a virtual keyboard, as described above, where a configuration of the virtual key locations of the virtual keyboard may be held constant across the plurality of electronic screen overlays.

At least one embodiment of the present invention includes a plurality of linked electronic screen overlays, as described above, all of which may occupy the same region of space on a graphic display when they are displayed so that only one overlay may be displayed for the operator at any given moment.

At least one embodiment of the present invention includes a system, method, computer readable medium and/or article of manufacture displaying a plurality of polysemous symbols, each of which may be relatively centrally disposed on at least one location of the virtual keyboard of a subset of one or more of a plurality of linked electronic screen overlays, as described above.

At least one embodiment of the present invention includes a system, method, computer readable medium and/or article of manufacture displaying a plurality of virtual key locations, as described above, each of which may include a corresponding polysemous symbol and a corresponding embedded link to retrieve and display an electronic screen overlay that differs from the electronic screen overlay that is currently displayed for the operator. As such, the electronic screen overlay that is displayed for the operator may change when a key location including a polysemous symbol and an embedded link is triggered or selected. Although key locations and/or polysemous symbols may be included on a plurality of linked electronic screen overlays, the embedded link that corresponds to a key location and/or symbol on one electronic screen overlay may be unique and differ from an embedded link that corresponds to the same key location and/or symbol on other electronic screen overlays. Note that the same symbol can be included on multiple electronic screen overlays and may exist at the same key location, for example.

At least one embodiment of the present invention provides a system, method, computer readable medium and/or article of manufacture including a plurality of polysemous symbols, each of which may be relatively centrally disposed on a location of the virtual keyboard of at least one of a plurality of linked electronic screen overlays, and which may produce the speech and/or text output of a corresponding previously stored message when triggered. Although each polysemous symbol may be included on a plurality of linked electronic screen overlays, the previously stored message that corresponds to a symbol on one electronic screen overlay (when sequenced with other symbols) may be unique and differ from the previously stored message that corresponds to the same symbol on other electronic screen overlays (when sequenced with other symbols). Note that the same symbol can be included on multiple electronic screen overlays and may exist at the same key location, for example.

At least one embodiment of the present invention includes a system, method, computer readable medium and/or article of manufacture including a plurality of linked electronic screen overlays, as described above, where the virtual keys of the virtual keyboard on each electronic screen overlay may include one of a plurality of polysemous symbols, as described above, wherein the included corresponding polysemous symbols may vary across the plurality of electronic screen overlays, and may exist at the same key location, for example.

At least one embodiment of the present invention includes a system, method, computer readable medium and/or article of manufacture including a plurality of linked electronic screen overlays, as described above, where a given polysemous symbol may be relatively centrally disposed on one or more locations of the virtual keyboard of one or more of the plurality of linked electronic screen overlays, and where the given polysemous symbol may be relatively centrally disposed in the same one or more locations on the virtual keyboards of all linked electronic screen overlays that include the symbol. In this way, the key locations of the given polysemous symbol may be held constant across the whole plurality of linked electronic screen overlays.

At least one embodiment of the present invention includes a system, method, computer readable medium and/or article of manufacture including a plurality of polysemous symbols, as described above, each of which may be included on the virtual keyboards of a subset of a plurality of linked electronic screen overlays, as described above, where the key locations of each of the plurality of polysemous symbols may be held constant across the whole plurality of linked electronic screen overlays.

At least one embodiment of the present invention includes a system, method, computer readable medium and/or article of manufacture including a first level electronic screen overlay or CORE HOME overlay, which may include all of a plurality of polysemous symbols, as described above.

At least one embodiment of the present invention includes a system, method, computer readable medium and/or article of manufacture including a first level electronic screen overlay or CORE HOME overlay, which may include all of a plurality of polysemous symbols, as described above, where at least one of these polysemous symbols may include an embedded link to a second level electronic screen overlay.

At least one embodiment of the present invention includes a system, method, computer readable medium and/or article of manufacture including a first level electronic screen overlay or CORE HOME overlay, which may include a plurality of polysemous symbols, as described above, and a plurality of symbols which, when triggering or activation is detected, can trigger production of a speech and/or text output of a corresponding previously stored message.

At least one embodiment of the present invention includes a system, method, computer readable medium and/or article of manufacture including a plurality of second level electronic screen overlays, each of which may be accessed by triggering a link that is embeddedly connected or corresponded to a polysemous symbol and/or key location on the first level electronic screen overlay.

In at least one embodiment of the present invention, each second level electronic screen overlay can only be accessed by triggering or selecting one of the plurality of polysemous symbols on the first level electronic screen overlay.

At least one embodiment of the present invention includes a system, method, computer readable medium and/or article of manufacture including a plurality of second level electronic screen overlays, as described above, each of which may include a subset of the plurality of polysemous symbols included on the first level electronic screen overlay.

At least one embodiment of the present invention includes a system, method, computer readable medium and/or article of manufacture including a plurality of second level electronic screen overlays, as described above, each of which may include a subset of one or more keys which may be blank and which do not include any corresponding symbol which can be triggered by an operator (and thus at least temporarily inactive).

At least one embodiment of the present invention includes a system, method, computer readable medium and/or article of manufacture including at least one key location and/or symbol on each of at least one of a plurality of second level electronic screen overlays, as described above, that includes and/or corresponds to an embedded link to the first level electronic screen overlay to return the user to the first level electronic screen overlay or CORE HOME overlay.

At least one embodiment of the present invention includes a system, method, computer readable medium and/or article of manufacture including a plurality of second level electronic screen overlays, as described above, each of which may include at least one polysemous symbol that can be selected and thus triggered to produce the speech and/or text output of a corresponding previously stored message and that includes an embedded link to the first level electronic screen overlay or CORE HOME overlay, as described above. As such, the user may be returned to the CORE HOME overlay as a function of a continuous input system that eliminates the extra keystrokes necessary to change screens.

At least one embodiment of the present invention includes a system, method, computer readable medium and/or article of manufacture including a plurality of second level electronic screen overlays, as described above, each of which may include at least one non-polysemous symbol that can be triggered to produce the speech and/or text output of a corresponding previously stored message and includes an embedded link to the first level electronic screen overlay or CORE HOME overlay, as described above.

At least one embodiment of the present invention includes a system, method, computer readable medium and/or article of manufacture including a plurality of second level electronic screen overlays, as described above, each of which may include at least one intermediate polysemous symbol that includes an embedded link to a third level electronic screen overlay.

At least one embodiment of the present invention includes a system, method, computer readable medium and/or article of manufacture including a plurality of third level electronic screen overlays that may be accessed by triggering a link that is embedded in a polysemous or non-polysemous symbol on one of the plurality of second level electronic screen overlays.

At least one embodiment of the present invention includes a system, method, computer readable medium and/or article of manufacture including a plurality of second level electronic screen overlays, as described above, each of which may include at least one non-polysemous symbol that includes an embedded link to a third level electronic screen overlay.

In at least one embodiment of the present invention, each third level electronic screen overlay can only be accessed by triggering, via a processor receiving an indication of selection thereof, one of the one or more polysemous or non-polysemous symbols on one of the plurality of second level electronic screen overlays. Given that a second level electronic screen overlay may only be accessed by triggering one of the plurality of polysemous symbols on the first level electronic screen overlay, there may be only one sequence of symbols on sequentially linked electronic screen overlays that can be used to access a specific third-level electronic screen overlay.

At least one embodiment of the present invention includes a system, method, computer readable medium and/or article of manufacture including a plurality of third level electronic screen overlays, as described above, each of which may include a subset of one or more of a plurality of polysemous symbols.

At least one embodiment of the present invention includes a system, method, computer readable medium and/or article of manufacture including a plurality of third level electronic screen overlays, as described above, each of which may include one or more non-polysemous symbols.

At least one embodiment of the present invention includes at least one symbol on each of a plurality of third level electronic screen overlays, as described above, that includes an embedded link to the first level electronic screen overlay or CORE HOME overlay, as described above.

At least one embodiment of the present invention includes a system, method, computer readable medium and/or article of manufacture including a plurality of third level electronic screen overlays, as described above, each of which may include at least one polysemous or non-polysemous symbol that can be triggered to produce the speech and/or text output of a corresponding previously stored message and includes an embedded link to the first level electronic screen overlay or CORE HOME overlay, as described above.

In at least one embodiment of a system, method, computer readable medium and/or article of manufacture of the present invention, an operator may trigger, via selection thereof, a sequence of two polysemous symbols that are located on two sequentially displayed linked electronic screen overlays to produce a speech or text output of a previously stored message using the following process, for example.

An initial electronic screen overlay 500, such as that shown in FIGS. 3A and 3B for example, is shown on the touch sensitive display 112 of the portable multifunction device 100; the electronic screen overlay 500 including a grid of symbols for example, stored in a database in memory 102 for example, and visually displayed to the user on an LCD display, for example, of the touch sensitive display 112. The initial electronic screen overlay 500 may be referred to as the 'CORE HOME overlay,' for example.

Polysemous and non-polysemous symbols are initially provided for selection on the initial electronic screen overlay 500 or 'CORE HOME overlay', displayed with symbols for selection on touch sensitive display 112, for example. Thereafter, triggering of an initial polysemous symbol of the sequence on the initial or first level electronic screen overlay then may begin upon user selection (via selection using a touch panel key or other form of input, for example on the touch sensitive display 112), as described above, where the initially selected polysemous symbol may include an embedded link to retrieve (upon the processor 120, for example, receiving an indication of selection of a key location corresponding to the symbol) and trigger display of a second level electronic screen overlay (the display being displayed on touch sensitive display 112, for example, in place of the first level electronic screen overlay, for example).

The aforementioned may occur, for example, by the processor 120 receiving an indication of user selection by determining the XY position of the activation on the touch sensitive display 112 to identify the position of the initially selected polysemous symbol within the CORE HOME overlay. This selected polysemous symbol may be one of a plurality of selectable polysemous symbols of the 'CORE HOME overlay' stored in association with, and marked in the database in memory 102 for example, a pointer to a secondary electronic screen overlay. In response to the processor 120 determining selection of the initially selected polysemous symbol, the processor 120 may then control the touch sensitive display 112 to display the secondary electronic screen overlay indicated by the pointer, the secondary electronic screen overlay being the electronic screen overlay associated via a pointer with the selected polysemous symbol and being different from the initial electronic screen overlay or 'CORE HOME overlay'. The contents of this secondary electronic screen overlay can further be directed by the processor 120 to replace the content of the CORE HOME overlay on the touch sensitive display 112 from which the initial polysemous symbol was selected.

Thereafter, the processor 120 may receive an indication of selection of a terminal (final) polysemous symbol of a sequence, from the currently displayed second level (secondary) electronic screen overlay for example (via selection using a touch panel key or some other form of input, for example), as described above, where the selected final polysemous symbol triggers (upon the processor 120, for example, receiving an indication of selection of a key location corresponding to the terminal symbol) output of a previously stored message (word, phrase, morpheme or message) corresponding to the symbol sequence including the selected first and terminal symbols (displayed on touch sensitive display 112, output via a speaker, etc.). Thus, a polysemous or non-polysemous symbol on the secondary electronic screen overlay can serve as a terminal symbol. In this case, detection of selection of the symbol, through that described above, may cause the processor 120 to access a message (word, phrase, morpheme or message) stored in memory 102 and linked in the database to a symbol sequence including the initially selected symbol and the selected symbol provided on the displayed second electronic screen overlay. The message may contain a text string which can be shown on the LCD display of the touch sensitive display 120, spoken via a speech synthesizer, printed, etc., or otherwise output.

Selection of the terminal polysemous symbol of the two symbol sequence that is on the second level electronic screen overlay may further trigger display of the first level electronic screen overlay or 'CORE HOME overlay' (in place of the second level electronic screen overlay for example and in addition to the outputting of the stored message, e.g. subsequent thereto or simultaneous therewith). This may occur subsequent to the symbol being selected so that the operator may thereafter begin executing a new function, such as selection of a next sequence of polysemous symbols, for example. This automatic function may allow the system to act as a continuous input device that does not require additional keystrokes to return to the first level electronic screen overlay after completion of a valid two symbol sequence. In addition to acting upon linked text string as described above, the selection of a terminal symbol may also trigger the contents of the secondary electronic screen display to be replaced by the contents of the CORE HOME overlay. Again, similar to that discussed previously, this can occur via storage of an embedded link in association with the terminal symbol in the database of memory 102 for example.

Note that all key locations on the any level electronic screen overlay need not correspond solely to symbols including an embedded link, let alone polysemous symbols including an embedded link. Note also that key locations corresponding to a symbol including an embedded link on any level electronic screen overlay may be differentiated from key locations corresponding a symbol which does not include an embedded link, by including a common displayable additional symbol for all key locations corresponding to symbols which include an embedded link, for example (and/or in any other way, such as by including differentiated lettering on the corresponding key location, for example).

In at least one embodiment of a system, method, computer readable medium and/or article of manufacture of the present invention, an operator may trigger a sequence of three polysemous symbols that are located on three sequentially displayed linked electronic screen overlays to produce a speech or text output of a previously stored message using the following process, for example.

Polysemous and non-polysemous symbols are initially provided for selection on the initial electronic screen overlay 500 or 'CORE HOME overlay', displayed with symbols for selection on touch sensitive display 112, for example. Thereafter, triggering of an initial polysemous symbol of the sequence on the initial or first level electronic screen overlay then may begin upon user selection (via selection using a touch panel key or other form of input, for example on the touch sensitive display 112), as described above, where the initially selected polysemous symbol may include an embedded link to retrieve (upon the processor 120, for example, receiving an indication of selection of a key location corresponding to the symbol) and trigger display of a second level electronic screen overlay (the display being displayed on touch sensitive display 112, for example, in place of the first level electronic screen overlay, for example).

It can further include triggering an intermediate polysemous symbol of the same sequence (via selection of, and detection of selection by processor 120, a symbol of the displayed second level electronic screen overlay using a touch panel key or some other form of input on touch sensitive display 112, for example), as described above, where the selected intermediate polysemous symbol includes a corresponding embedded link stored in memory 102 and retrievable via processor 120 to trigger the processor 120 to control display of a third level electronic screen overlay on touch sensitive display 112. The aforementioned may be achieved by an initial electronic screen overlay being shown on the visual display of the touch sensitive display system 112; an electronic screen overlay being a grid of symbols, stored in a database in the memory 102 and visually displayed to the user on an LCD display of the touch sensitive display system 112, for example. The initial electronic screen overlay will be referred to as the 'CORE HOME overlay.'

Symbol activation may be detected by the processor 120 on the touchscreen of the touch sensitive display 112 or alternative input device. The processor 120 may then determine the XY position of the activation to identify the initial polysemous symbol within the CORE HOME overlay. This polysemous symbol may be marked in the database in memory 102 with a pointer to a secondary electronic screen overlay. The contents of this secondary electronic screen overlay may then be controlled by processor 120 to replace the content of the CORE HOME overlay from which the initial polysemous symbol was selected.

A second polysemous symbol can then be selected from the symbols of the second electronic screen overlay. Again, the processor 120 receives an indication of and determines the XY position of the activation to identify the second selected polysemous symbol within the secondary electronic screen overlay. This polysemous symbol may be one marked in the database in memory 102 with a pointer to a third electronic screen overlay. In response to the processor 120 determining selection of the second selected polysemous symbol, the processor 120 may then control the touch sensitive display 112 to display the third electronic screen overlay indicated by the pointer, the third electronic screen overlay being the electronic screen overlay associated via a pointer with the second selected polysemous symbol and being different from the second electronic screen overlay. The contents of this third level electronic screen overlay may replace the content of the secondary electronic screen overlay from which the second polysemous symbol was selected.

Selection of a the terminal polysemous symbol of the sequence may then occur on the currently displayed third level electronic screen overlay (via selection using a touch panel key or some other form of input, for example), as described above, where the final polysemous symbol triggers (upon a processor, 120 for example, receiving an indication of detection of a key location corresponding to the terminal symbol) output of a previously stored message (word, phrase, morpheme or message) corresponding to the symbol sequence including the selected first, second and terminal symbols (displayed on touch sensitive display 112, output via a speaker, etc.).

Thus, as described above, a polysemous or non-polysemous symbol on the second level or third level electronic screen display can serve as a terminal symbol. In this case, detection of selection of the symbol, through that described above, may cause the processor 120 to access a message (word, phrase, morpheme or message) stored in memory 102 and linked in the database to a symbol sequence including the initially selected symbol, the intermediate symbol and the selected symbol provided on the displayed second electronic screen overlay. The message may contain a text string which can be shown on the LCD display of the touch sensitive display 120, spoken via a speech synthesizer, printed, etc., or otherwise output.

Selection of the terminal polysemous symbol of the three symbol sequence that is on the third level electronic screen overlay (or similarly the second level electronic screen overlay in a two symbol sequence) may further trigger display of the first level electronic screen overlay or 'CORE HOME overlay' (in place of the third level electronic screen overlay for example, or similarly the second level electronic screen overlay in a two symbol sequence) and in addition to the outputting of the stored message, e.g. subsequent thereto or simultaneous therewith). This may occur subsequent to the symbol being selected so that the operator may thereafter begin executing a new function, such as selection of a next sequence of polysemous symbols, for example. This automatic function may allow the system to act as a continuous input device that does not require additional keystrokes to return to the first level electronic screen overlay after completion of a valid three symbol sequence. In addition to acting upon linked text string as described above, the selection of a terminal symbol may also trigger the contents of the second level or third level electronic screen display to be replaced by the contents of the CORE HOME overlay. Again, similar to that discussed previously, this can occur via storage of an embedded link in association with the terminal symbol in the database of memory 102 for example.

Note that all key locations on the any level electronic screen overlay need not correspond solely to symbols including an embedded link, let alone polysemous symbols including an embedded link. Note also that key locations corresponding to a symbol including an embedded link on any level electronic screen overlay may be differentiated from key locations corresponding to a symbol which does not include an embedded link, by including a common additional symbol for all key locations corresponding to symbols which include an embedded link, for example (and/or in any other way, such as by including differentiated lettering on the corresponding key location, for example).

In at least one embodiment of a system, method, computer readable medium and/or article of manufacture of the present invention, a pointer associated with each of a plurality of second level linked electronic screen overlays may store, in memory 102, the name of the polysemous symbol on the first level linked electronic screen overlay that can be triggered to retrieve and display the second level linked electronic screen overlay. Similarly, a pointer may be associated with each of a plurality of third level linked electronic screen overlays which stores, in memory 102, the names of the symbols on the first level linked electronic screen overlay and subsequent second level linked electronic screen overlay that can be triggered to retrieve and display the third level linked electronic screen overlay. There may also be a pointer that stores in memory 102 a name associated with the first level linked electronic overlay, "Core Home" for example. These pointers may automatically populate an overlay name field to create a unique name for each of the plurality of linked electronic screen overlays that corresponds to the symbol sequence used to retrieve and display that overlay, and may be accessed via processor 120 from memory 102.

In at least one embodiment of a system, method, computer readable medium and/or article of manufacture of the present invention, a unique name may be assigned to each of a plurality of sequentially linked electronic screen overlays, where the first level linked electronic screen overlay may be assigned a default name, "CORE HOME", for example.

In at least one embodiment of a system, method, computer readable medium and/or article of manufacture of the present invention, a unique name may be assigned to each of a plurality of sequentially linked electronic screen overlays, where each of a plurality of second level linked electronic screen overlays may be assigned a name that includes the name of the polysemous symbol that may be triggered on the first level electronic screen overlay to retrieve and display the specific second level linked electronic screen overlay.

In at least one embodiment of a system, method, computer readable medium and/or article of manufacture of the present invention, a unique name may be assigned to each of a plurality of sequentially linked electronic screen overlays, where each of a plurality of third level linked electronic screen overlays may be assigned a name that includes the name of the polysemous symbol that may be triggered or selected on the first level electronic screen overlay and the name of the polysemous or non-polysemous symbol that must be triggered or selected on a second-level electronic screen overlay to retrieve and display the specific third level linked electronic screen overlay.

In at least one embodiment of a system, method, computer readable medium and/or article of manufacture of the present invention, a default unique name may be automatically assigned to any new electronic screen overlay created by an operator, where the assigned name includes the sequenced names of one or more polysemous symbols on sequentially linked electronic screen overlays that may be triggered or selected in order to retrieve and display the newly created electronic screen overlay. In this way, the name of any new overlay that is added to the system is consistent with the names of most or all of a plurality of previously existing linked electronic screen overlays in the system.

FIGS. 4A-4J illustrate, in an example embodiment, how a plurality of polysemous symbols in a simplified electronic screen overlay (for example purposes only) displayed on keys of a virtual keyboard on a touch sensitive display 112 of a multifunction device 100 may be sequentially triggered, selected or activated on a plurality of sequentially linked electronic screen overlays present to produce one of a plurality of messages previously stored in a memory 102.

FIG. 4A shows a first level electronic screen overlay 600, which can be known as the "CORE HOME" overlay for example, using only a six key location virtual keyboard and six corresponding polysemous symbols of six virtual key locations of the virtual keyboard (again, this six location virtual keyboard is used in a merely example and illustrative manner noting that many electronic screen overlays include 84-144 key locations and/or potential symbols, for example). On the first level electronic screen overlay 600 of FIG. 4A, the key location corresponding to the polysemous "I" symbol 602 (the multi-meaning pictorial illustration of a lady shown in FIG. 4A for example) may be triggered or selected (the processor 120 receives an indication of the selected XY location of the touch sensitive display 112 corresponding to the virtual key location including "I" symbol 602, and retrieves information from memory 102 indicating that the "I" symbol is stored corresponding to the selected XY location) as an initial symbol in a polysemous symbol sequence. When the "I" symbol 602 is triggered, a second level electronic screen overlay 620 of FIG. 4B, named the "I" overlay 620 for example, may be retrieved by processor 120 from memory 102 based upon information stored in memory 102 and then displayed on the touch sensitive display 112 as shown in FIG. 4B (noting that the processor 120, in response receiving the indication of the selected XY location of the touch sensitive display 112 corresponding to the "I" symbol 602, retrieves further information corresponding to the "I" symbol location, namely a pointer or electronic link in memory 102, indicating that the "I" overlay 620 should be displayed on the touch sensitive display 112 in place of the CORE HOME overlay 600).

Alternative to selection of the "I" symbol 602 which triggers display of the "I" overlay 620 on the first level electronic screen overlay 600 of FIG. 4A, the key location corresponding to the polysemous VERB symbol 604 (the multi-meaning pictorial illustration of a handyman called Mr. Action Man for example) may be triggered as the only (terminal) symbol in a one-symbol sequence to produce an output of the previously stored message "are" (the processor 120 receives an indication of the selected XY location of the touch sensitive display 112 corresponding to the polysemous VERB symbol 604, and retrieves information from memory 102 indicating that this is a one symbol sequence triggering output of the corresponding word, phrase, morpheme or message stored in memory 102, namely output of the word "are"). A polysemous symbol such as the VERB symbol 604 may always function as the terminal symbol in a plurality of polysemous symbol sequences (even when it is a second or third symbol in a sequence for example).

Alternative to selection of the "I" symbol 602 which triggers display of the "I" overlay 620 on the first level electronic screen overlay 600 of FIG. 4A, the key location corresponding to the polysemous KNOT symbol 606 (the multi-meaning pictorial illustration of a rope tied in a KNOT, for example) may be triggered as the only (terminal) symbol in a one-symbol sequence to produce, in the same manner as that described above regarding the VERB symbol 604, the previously stored message "not." A polysemous symbol such as the KNOT symbol 606 may function in different positions of different polysemous symbol sequences, including functioning as intermediate and terminal symbols, for example.

Figure 4F:
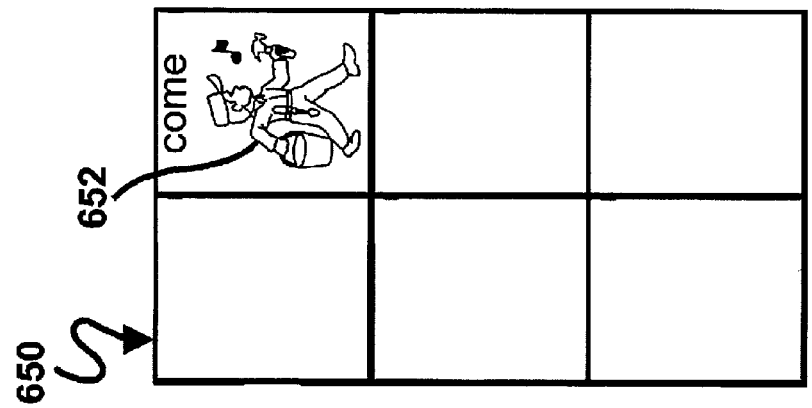
FIGS. 4 A-J illustrate example embodiments of electronic screen overlays.

Alternative to selection of the "I" symbol 602 which triggers display of the "I" overlay 620 on the first level electronic screen overlay 600 of FIG. 4A, the key location corresponding to the polysemous WANT symbol 608 (the multi-meaning pictorial illustration of a boy reaching for a book, for example), the key location corresponding to the polysemous APPLE symbol 610 (the multi-meaning pictorial illustration of an apple with a bee on it, for example) and the key location corresponding to the polysemous DOG symbol 612 (the multi-meaning pictorial illustration of a dog with a newspaper in his mouth, for example) may each be separately triggered as the initial symbol in a plurality of polysemous symbol sequences. When the key location corresponding to the WANT symbol 608, APPLE symbol 610 or DOG symbol 612 is triggered, a corresponding second level electronic screen overlay may be retrieved (in the same manner described above with the triggering of the "I" symbol 602 and the display of the second level electronic screen overlay 620 of FIG. 4B for example), which then respectively results in display of a "WANT" overlay 630 of FIG. 4D, an "APPLE" overlay 640 of FIG. 4E, and a "DOG" overlay of FIG. 4F.

The first level linked electronic screen overlay 600 of FIG. 4A includes key locations that may be triggered as an initial polysemous symbol in a plurality of longer sequences of polysemous symbols on sequentially linked electronic overlays and polysemous symbols that may be triggered as the terminal symbol in a one symbol sequence to produce a previously stored message. As examples, the "I" symbol 602, WANT symbol 608, APPLE symbol 610, and DOG symbol 612 on the first level electronic screen overlay 600 may all function as initial polysemous symbols in a plurality of longer symbol sequences across plural electronic screen overlays. The VERB symbol 604 and KNOT symbol 606 may function as terminal symbols in one or single symbol sequences on the first level electronic screen overlay 600.

FIG. 4B shows a second level linked electronic screen overlay 620 with a six key location virtual keyboard similar to the six key location virtual keyboard of the first level electronic screen overlay 600 in FIG. 4A. This overlay 620, named the "I" overlay 620 for example, may be retrieved and displayed when the "I" symbol 602 on the first level linked electronic screen overlay 600 is triggered. Symbols on this second level linked electronic screen overlay 620 may be selected as a second symbol in polysemous symbol sequences that begin with the "I" symbol, which is triggered on the first level electronic screen overlay 600. The "I", VERB, KNOT, WANT, and APPLE symbols on the second level linked electronic screen overlay 620 in FIG. 4B are included on virtual keys corresponding to virtual keys with the same symbols at the same respective key locations on the first level linked electronic screen overlay 600 because each of these symbols may be triggered as the second symbol in valid sequences beginning with the "I" symbol 602. The DOG symbol from key 612 of FIG. 4A is not displayed in its respective key location on the second level linked electronic screen overlay 620 in FIG. 4B because there are no valid symbol sequences that begin with the "I" and DOG symbols.

The "I", VERB, WANT, and APPLE symbols on the second level linked electronic screen overlay 620 in FIG. 4B may be triggered as the terminal symbol in sequences of two polysemous symbols beginning with the "I" symbol. When the key location corresponding to one of these symbols is triggered, the corresponding previously stored message (corresponding to the sequence "I" plus one of "I", VERB, WANT, and APPLE) is produced and the first level linked electronic overlay 600 is retrieved and displayed once again (once of the aforementioned keys is triggered or selected in FIG. 4B, the processor 120 retrieves both a corresponding word, phrase, morpheme or message and a pointer to display the first level linked electronic overlay 600 from memory 102).

The KNOT symbol 622 on the second level linked electronic screen overlay 620 in FIG. 4B may be triggered as the intermediate symbol in at least one sequence of three polysemous symbols beginning with the "I" and KNOT symbols. When this KNOT symbol 622 is triggered, the third level linked electronic screen overlay 660 of FIG. 4G, named the "I KNOT" overlay for example, may be retrieved by the processor 120 and displayed on the touch sensitive display 112.

FIG. 4C shows a place-holder for a second level linked electronic overlay 628 named the "VERB" overlay, which may be retrieved and displayed if the VERB symbol on the first level linked electronic overlay is re-programmed to link to a second level electronic screen overlay useful for production of one or more longer polysemous symbol sequences that begin with the VERB symbol. The name of this electronic overlay will be assigned by default if the VERB symbol on the first level electronic screen overlay is reprogrammed in a way that necessitates the introduction of a corresponding second level electronic screen overlay.

Figure 4E:
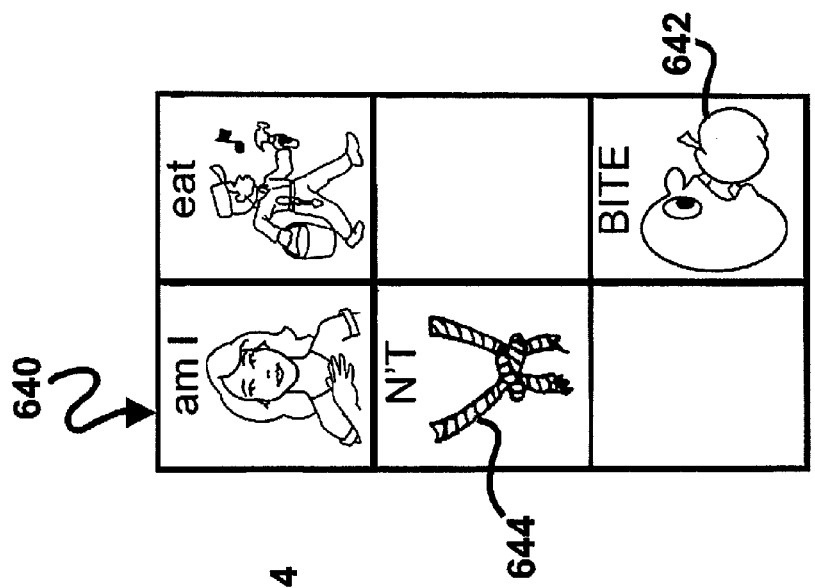
Figure 4D:
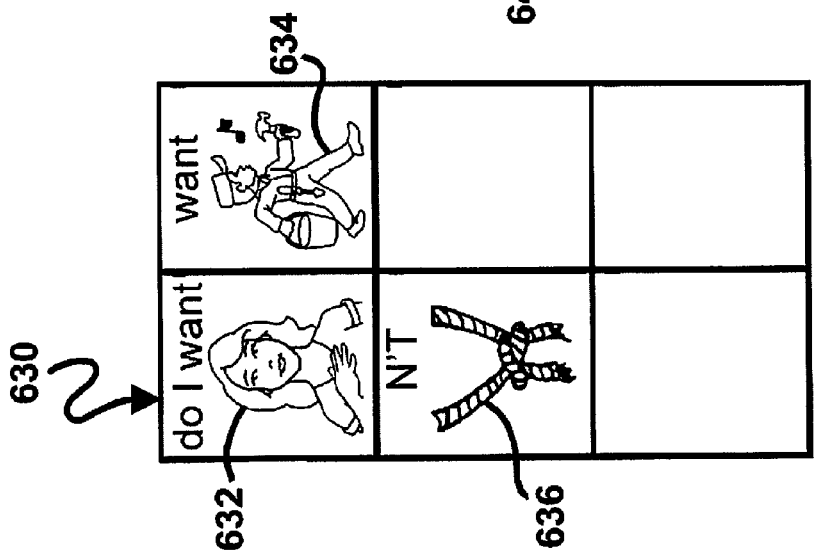

FIG. 4D shows a second level linked electronic screen overlay 630 named the "WANT" overlay for example, which may be retrieved and displayed upon the WANT symbol 608 on the first level linked electronic screen overlay 600 being triggered. Symbols on this overlay 630 may be selected as the second symbol in polysemous symbol sequences that begin with the WANT symbol 608, which is triggered on the first level electronic screen overlay 600. The "I", VERB, and KNOT symbols on the second level linked electronic screen overlay 630 in FIG. 4D are included on keys corresponding in location of the virtual keyboard to keys with the same symbols (same multi-meaning pictorial illustrations) on the first level linked electronic screen overlay 600 because each of these symbols may be triggered as the second symbol in valid sequences beginning with the WANT symbol 608. The "I" symbol 632 and VERB symbol 634 on the second level linked electronic screen overlay 630 in FIG. 4D may be triggered as the terminal symbol in sequences of two polysemous symbols beginning with the WANT symbol 608 to produce a corresponding previously stored message and retrieve and display the first level linked electronic screen overlay 600 once again, in a manner similar to that previously described.

The KNOT symbol 636 on the second level linked electronic screen overlay 630 in FIG. 4D may be triggered as the intermediate symbol in at least one sequence of three polysemous symbols beginning with the WANT symbol 608 and KNOT symbol 636. When this symbol is triggered, the third level linked electronic screen overlay 690 of FIG. 4J, named the "WANT KNOT" overlay may be retrieved and displayed.

FIG. 4E shows a second level linked electronic screen overlay 640 named the "APPLE" overlay, which may be retrieved and displayed if the key location corresponding to the APPLE symbol 610 on the first level linked electronic screen overlay 600 is triggered. Symbols on this overlay 640 may be selected as the second symbol in polysemous symbol sequences that begin with the APPLE symbol, which is triggered on the first level electronic screen overlay 600. The "I", VERB, KNOT, and DOG symbols on the second level linked electronic screen overlay in FIG. 4E are included on keys corresponding to keys with the same symbols on the first level linked electronic screen overlay 600 because each of these symbols may be triggered as the second symbol in valid sequences beginning with the APPLE symbol. The "I" and VERB symbols on the second level linked electronic screen overlay 640 in FIG. 4E may be triggered as the terminal symbol in sequences of two polysemous symbols beginning with the APPLE symbol to produce a corresponding previously stored message and retrieve and display the first level linked electronic screen overlay 600 once again. The KNOT and DOG symbols on the second level linked electronic screen overlay in FIG. 4E may each be triggered as the intermediate symbol in at least one sequence of three polysemous symbols beginning with the APPLE and KNOT or APPLE and DOG symbols, respectively. When either of these symbols triggered, a corresponding third level linked electronic screen overlay may be retrieved and displayed, which may be the "APPLE KNOT" overlay 670 of FIG. 4H or the "APPLE DOG" overlay 680 of FIG. 4I, respectively.

In FIG. 4E, the intermediate symbol 642, in the key location corresponding to the DOG symbol on FIG. 4A, is an embellished symbol of a "man biting a piece of fruit" to provide information about one or more previously stored messages that can be produced with symbol sequences beginning with the APPLE and DOG symbols.

FIG. 4F shows a second level linked electronic screen overlay 650 named the "DOG" overlay for example, which may be retrieved and displayed upon the key location corresponding to the DOG symbol 612 on the first level linked electronic screen overlay 600 being triggered. Symbols on this overlay may be selected as the second symbol in polysemous symbol sequences that begin with the DOG symbol 612, which is triggered on the first level electronic screen overlay 600. The VERB symbol 652 on the second level linked electronic screen overlay in FIG. 4F is included on the key corresponding to the key location of the key including the VERB symbol 604 on the first level linked electronic overlay 600 because it may be triggered as the second symbol in a valid sequence beginning with the DOG symbol 612. The VERB symbol 652 on the second level linked electronic screen overlay 650 in FIG. 4F may be triggered as the terminal symbol in a two symbol sequence beginning with the DOG symbol to produce a corresponding previously stored message and retrieve and display the first level linked electronic screen overlay once again, in the same manner previously described.

Figure 4I:
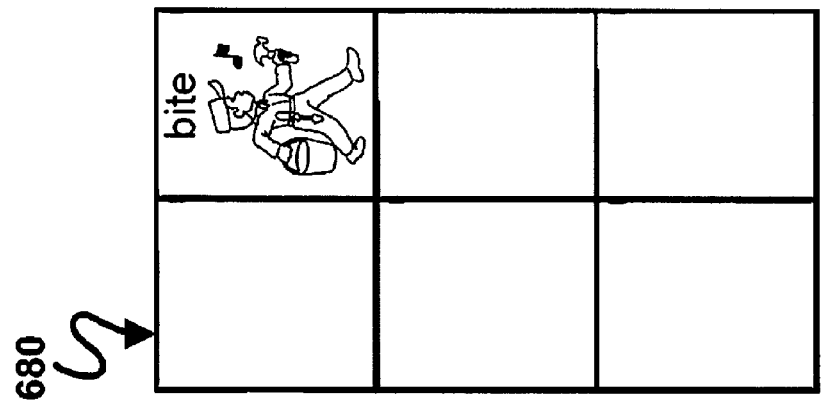
Figure 4H:
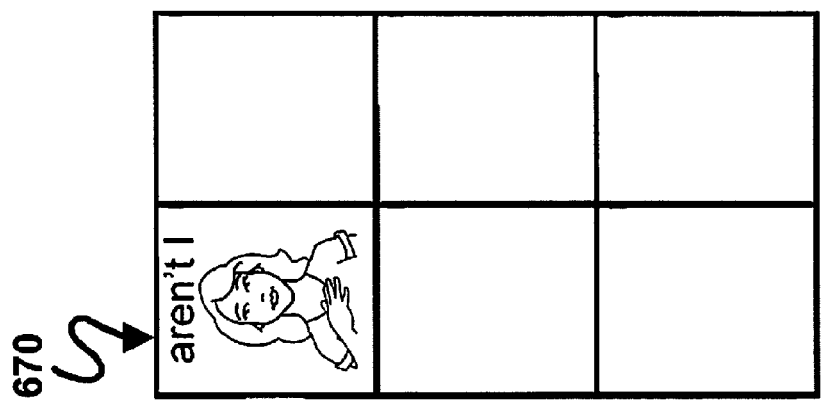
Figure 4G:
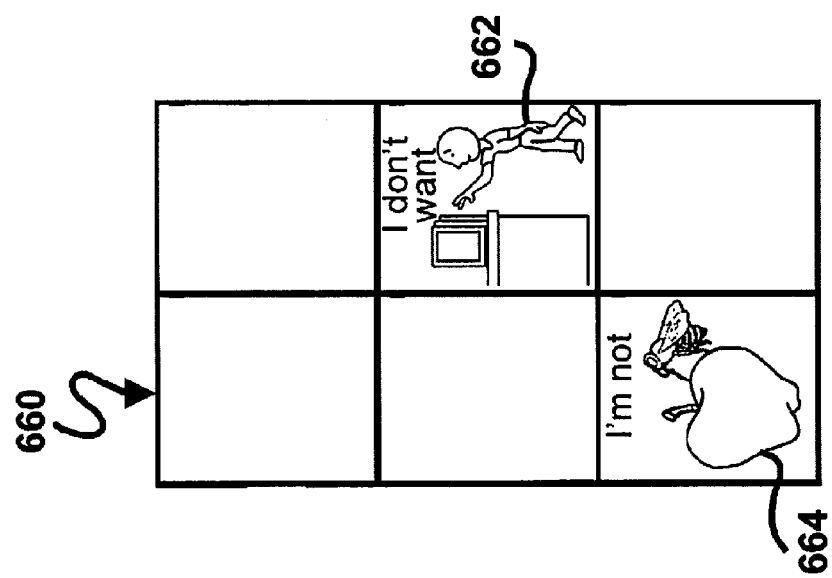

FIG. 4G shows a third level linked electronic overlay 660 named the "I KNOT" overlay for example, which may be retrieved if the key location corresponding to the I symbol 602 on the first level linked electronic screen overlay 600 is triggered and then the key location corresponding to the KNOT symbol 622 on the corresponding second level linked electronic overlay 620 is triggered. Symbols on this overlay 660 may be selected as the third symbol in polysemous symbol sequences that begin with the I and KNOT symbols.

The WANT symbol 662 and APPLE symbol 664 on the third level linked electronic screen overlay 660 in FIG. 4G are included on the key locations corresponding to the key locations of these symbols on the first level linked electronic overlay 600 because they may be triggered as the third symbol in valid sequences beginning with the I and KNOT symbols. Both of these symbols may be triggered as the terminal symbol in a three symbol sequence beginning with the "I" and KNOT symbols to produce a corresponding previously stored message and retrieve and display the first level linked electronic screen overlay 600 once again.

The "I", VERB, KNOT, and DOG symbols are not displayed in their respective locations on the third level linked electronic screen overlay 660 in FIG. 4G because they do not correspond to any valid symbol sequences.

FIG. 4H shows a third level linked electronic overlay 670 named the "APPLE KNOT" overlay for example, which may be retrieved if the APPLE symbol 610 on the first level linked electronic screen overlay 600 is triggered and then the KNOT symbol 644 on the corresponding second level linked electronic overlay 640 is triggered. Symbols on this overlay 670 may be selected as the third symbol in polysemous symbol sequences that begin with the APPLE and KNOT symbols.

FIG. 4I shows a third level linked electronic screen overlay 680 named the "APPLE DOG" overlay for example, which may be retrieved if the APPLE symbol 610 on the first level linked electronic screen overlay 600 is triggered and then the DOG symbol 642 on the corresponding second level linked electronic overlay 640 is triggered. Symbols on this overlay 680 may be selected as the third symbol in polysemous symbol sequences that begin with the APPLE and DOG symbols.

Figure 4J:
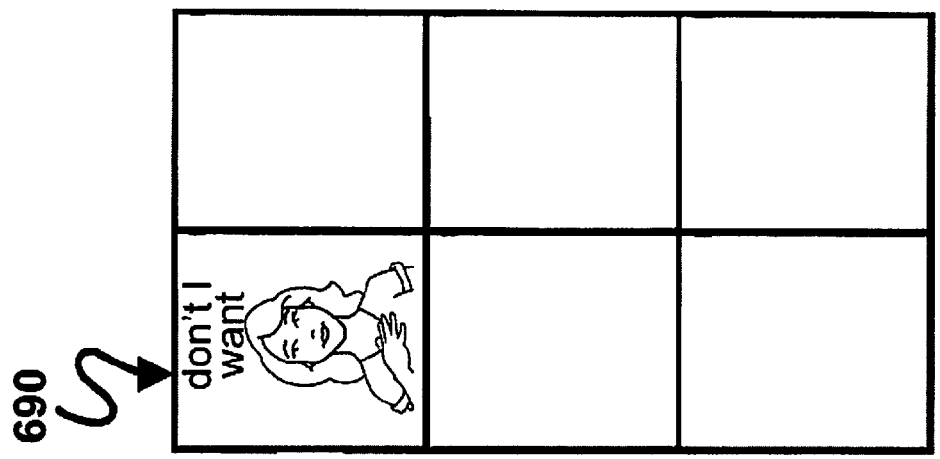

FIG. 4J shows a third level linked electronic overlay 690 named the "WANT KNOT" overlay for example, which may be retrieved if the WANT symbol 608 on the first level linked electronic screen overlay 600 is triggered and then the KNOT symbol 636 on the corresponding second level linked electronic overlay 630 is triggered. Symbols on this overlay 690 may be selected as the third symbol in polysemous symbol sequences that begin with the WANT and KNOT symbols.

Figure 5A:
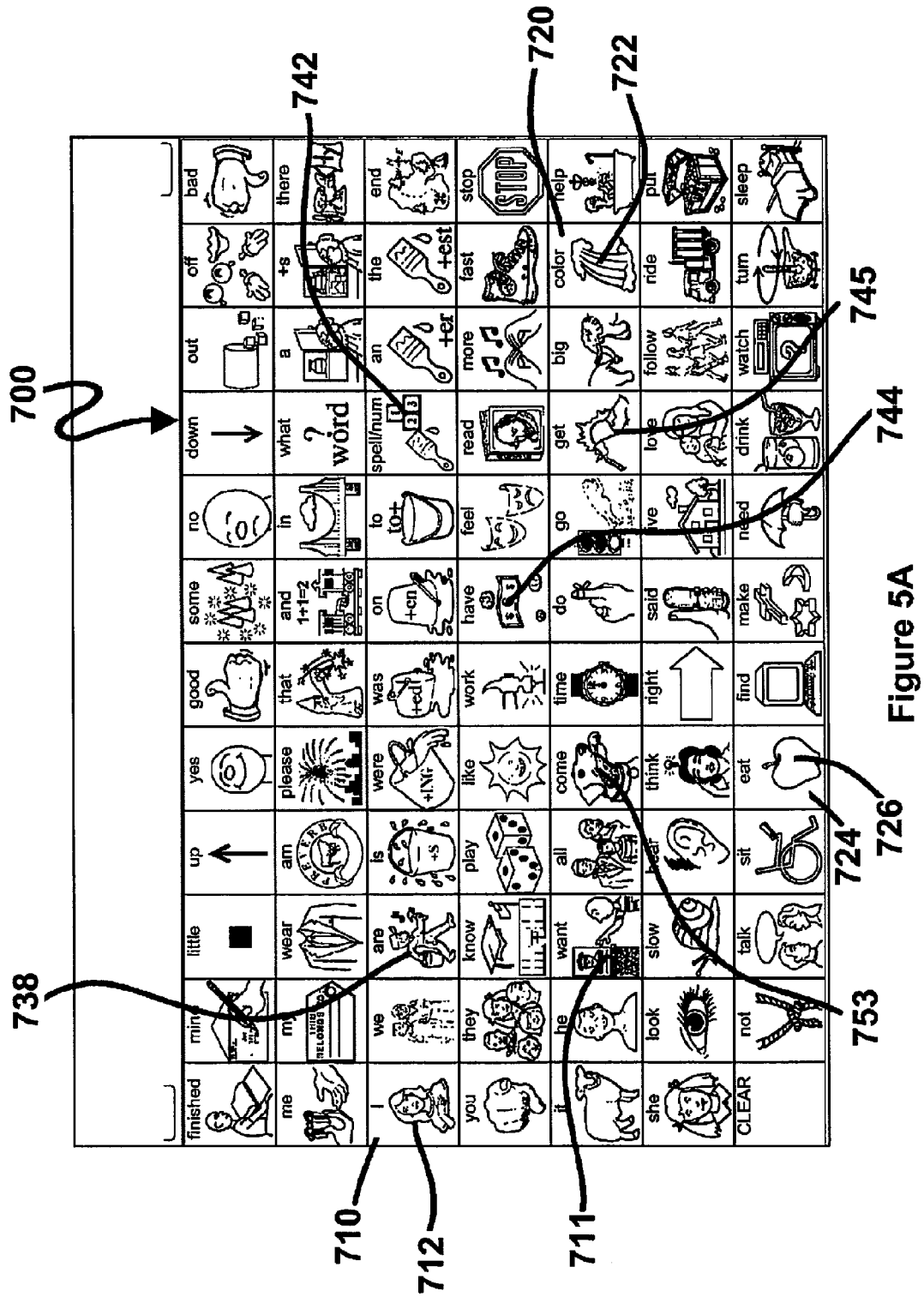
FIGS. 5 A-D illustrate example embodiments of electronic screen overlays.
Figure 5B:
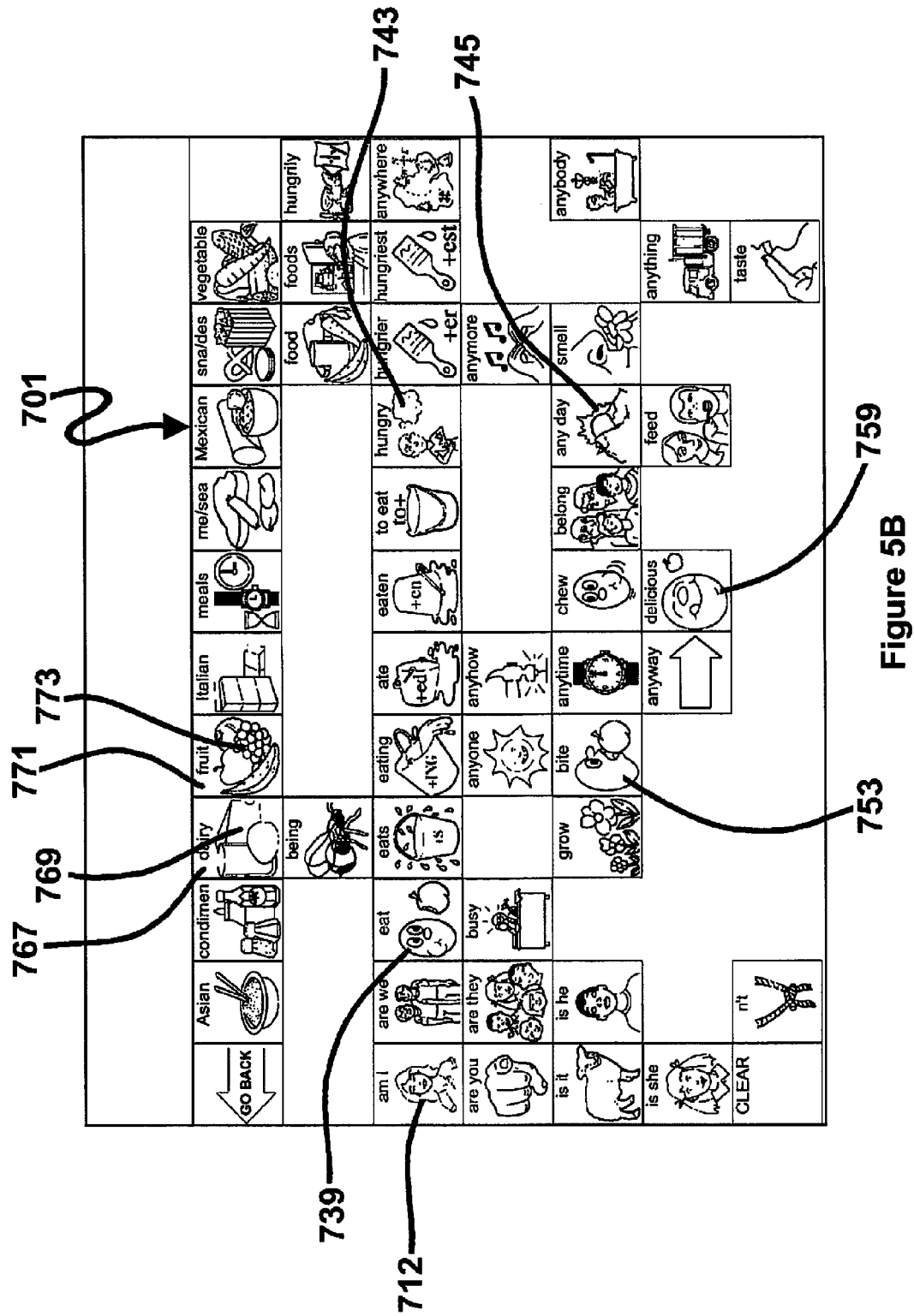
Figure 5C:
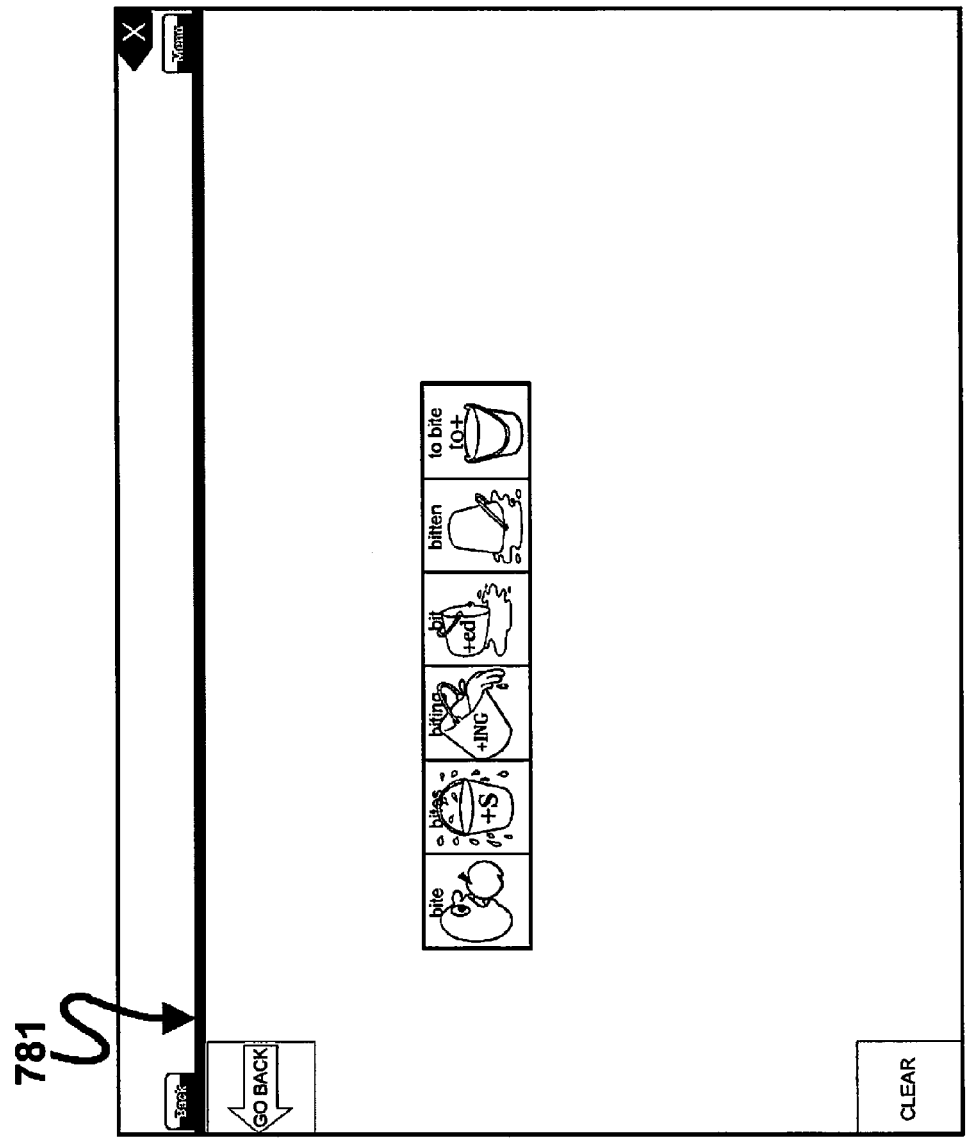

FIGS. 5A-C show a series of three sequentially linked electronic screen overlays for display on a touch sensitive display 112 of a portable multifunctional device 100 for example, from an embodiment of the present invention with 84 locations on the virtual keyboard on each of a plurality of linked electronic screen overlays. Each key location on each electronic screen overlay may include a relatively centrally disposed polysemous or non-polysemous symbol. FIG. 5A is the first level electronic screen overlay 700. FIG. 5B is a second level electronic screen overlay 701, which may be retrieved and displayed when an operator triggers a key location or virtual key on the first level electronic screen overlay 700 of FIG. 5A that includes a polysemous symbol that functions as an initial symbol in a plurality of polysemous symbol sequences. FIG. 5C is a third level electronic screen overlay 781, which may be retrieved and displayed when an operator triggers a sequence of two symbols, including selection of a key on the first level electronic screen overlay 700 of FIG. 5A that includes a polysemous symbol that functions as an initial symbol in a plurality of polysemous symbol sequences, and including selection of a key on the second level electronic screen overlay 701 of FIG. 5B that includes a polysemous symbol that functions as an intermediate symbol in a plurality of polysemous symbol sequences.

FIG. 5A shows a first level or initial electronic screen overlay 700, named the "CORE HOME" overlay for example with an 84 key location virtual keyboard and a plurality of polysemous symbols associated with various virtual keys or key locations of the virtual keyboard. On the first level electronic screen overlay 700 of FIG. 5A, the key 710 corresponding to the polysemous "I" symbol 712 may be triggered as the initial symbol in a plurality of polysemous symbol sequences. When the "I" symbol 712 (associated with key 710 located in Row 3, Column 1 of the virtual keyboard first level electronic screen overlay 700 of FIG. 5A) is triggered, a second level electronic screen overlay 751 named the "I" overlay for example, may be retrieved and displayed, and the operator may trigger one of a plurality of keys corresponding to second polysemous symbols to continue producing one of a plurality of previously stored messages, such as "I," "me", "I am", or "I can."

When the key 720 corresponding to the RAINBOW symbol 722 (associated with key 720 located in Row 5, Column 11 of the virtual keyboard first level electronic screen overlay 700 of FIG. 5A) is triggered, a second level electronic screen overlay named the "RAINBOW" overlay for example may be retrieved and displayed, and the operator may trigger one of a plurality of second polysemous symbols to continue producing one of a plurality of previously stored messages, such as "color," "coloring," "pretty," "paint," "red," "blue," and "green."

When the key 724 corresponding to the APPLE symbol 726 (Row 7, Column 5 of the virtual keyboard first level electronic screen overlay 700 of FIG. 5A) is triggered, the second level electronic screen overlay, named the "APPLE" overlay for example may be retrieved and displayed, and the operator may trigger one of a plurality of second polysemous symbols to continue producing one of a plurality of previously stored messages, such as "eat," "ate," "bite," "hungry," "am I," or "anyone." When the APPLE symbol (Row 7, Column 5) is triggered and the second level electronic screen overlay, named the "APPLE" overlay has been retrieved and displayed, the operator may also trigger one of a subset of second symbols that are non-polysemous to produce one of a plurality of previously stored messages that may be a fringe vocabulary word, "apple," "banana," or "burrito," for example.

FIG. 5B shows a second level linked electronic screen overlay 701 with an 84 location virtual keyboard similar to the 84 location virtual keyboard of the first level electronic screen overlay 700 in FIG. 5A. This overlay 701, named the "APPLE" overlay for example, may be retrieved and displayed when the APPLE symbol 726 on the first level linked electronic screen overlay 700 is triggered. Symbols on this overlay (some of which are the same as those in the same key locations as FIG. 5A and some of which are embellished symbols) may be selected as the second symbol in polysemous symbol sequences that begin with the APPLE symbol 726, which is triggered on the first level electronic screen overlay 700.

The I symbol 712 (Row 3, Column 1), VERB symbol 738, embellished from symbol 738 of FIG. 5A (Row 3, Column 3), ADJECTIVE symbol 743, embellished from symbol 742 of FIG. 5A (Row 3, Column 9), and MOUNTAIN symbol 745 (Row 5, Column 9) on the second level linked electronic screen overlay 701 in FIG. 5B may be triggered as the terminal symbol in sequences of two polysemous symbols beginning with the APPLE symbol 726. When a key corresponding to one of these symbols is triggered, the corresponding previously stored message (corresponding to the two symbol sequence) is produced and the first level linked electronic overlay 700 is retrieved and displayed once again.

The (embellished) DOG symbol 753 on the second level linked electronic screen overlay 701 in FIG. 5B may be triggered as the intermediate symbol in at least one sequence of three polysemous symbols beginning with the APPLE 726 and DOG 753 symbols. When the key corresponding to this (embellished) DOG symbol 753 is triggered, the third level linked electronic screen overlay 781 of FIG. 5C, named the "APPLE DOG" overlay for example, may be retrieved and displayed. The (embellished) DOG symbol 753 on the second level linked electronic overlay 701 in FIG. 5B may be used as an intermediate symbol in polysemous symbol sequences for producing different forms of the verb "bite."

The (embellished) PHONE symbol 759 (Row 6, Column 7) on the second level linked electronic screen overlay 701 in FIG. 5B may be triggered as the intermediate symbol in at least one sequence of three polysemous symbols beginning with the APPLE 726 and PHONE 759 symbols. When this symbol is triggered, a third level linked electronic screen overlay, named the "APPLE PHONE" overlay may be retrieved and displayed. The PHONE symbol 759 on the second level linked electronic overlay 701 in FIG. 5B may be used as an intermediate symbol in polysemous symbol sequences for producing different forms of the adjective "delicious."

The key 767 including the DAIRY symbol 769 (Row 1, Column 4) and the key 771 including the FRUIT symbol 773 (Row 1, Column 5) on the second level linked electronic screen overlay 701 in FIG. 5B are non-polysemous symbols that are each associated with a semantically related category of fringe words. The DAIRY symbol 769 on the second level linked electronic screen overlay 701 in FIG. 5B may function as an intermediate symbol in one or more sequences of symbols on sequentially linked electronic screen overlays beginning with the polysemous APPLE symbol 726 and the non-polysemous DAIRY symbol 769. When the DAIRY symbol 769 is triggered, a third level linked electronic screen overlay, named the "APPLE DAIRY" overlay for example may be retrieved and displayed. This "APPLE DAIRY" overlay may include one or more non-polysemous symbols corresponding to previously stored messages that are members of the category of "dairy" words. Examples of "dairy" words may include "milk," "cheese," and "yogurt." The FRUIT symbol 773 on the second level linked electronic screen overlay 701 in FIG. 5B may function as an intermediate symbol in one or more sequences of symbols on sequentially linked electronic screen overlays beginning with the polysemous APPLE symbol 726 and the non-polysemous FRUIT symbol 773. When the FRUIT symbol 773 is triggered, the third level linked electronic overlay 800 of FIG. 6, named the "APPLE FRUIT" overlay for example may be retrieved and displayed. This "APPLE FRUIT" overlay may include one or more non-polysemous symbols corresponding to previously stored messages that are members of the category of "fruit" words.

FIG. 5C shows a third level linked electronic screen overlay 781 with an 84 location virtual keyboard similar to the 84 location virtual keyboard of the first level electronic screen overlay in FIG. 5A. This overlay, named the "APPLE DOG" overlay, may be retrieved and displayed when the APPLE symbol 726 on the first level linked electronic screen overlay 700 is triggered and then the (embellished) DOG symbol 753 on the corresponding second level linked electronic overlay 701 is triggered. Symbols on this overlay 781 may be selected as the third symbol in polysemous symbol sequences that begin with the APPLE 726 and DOG 753 symbols.

Figure 5D:
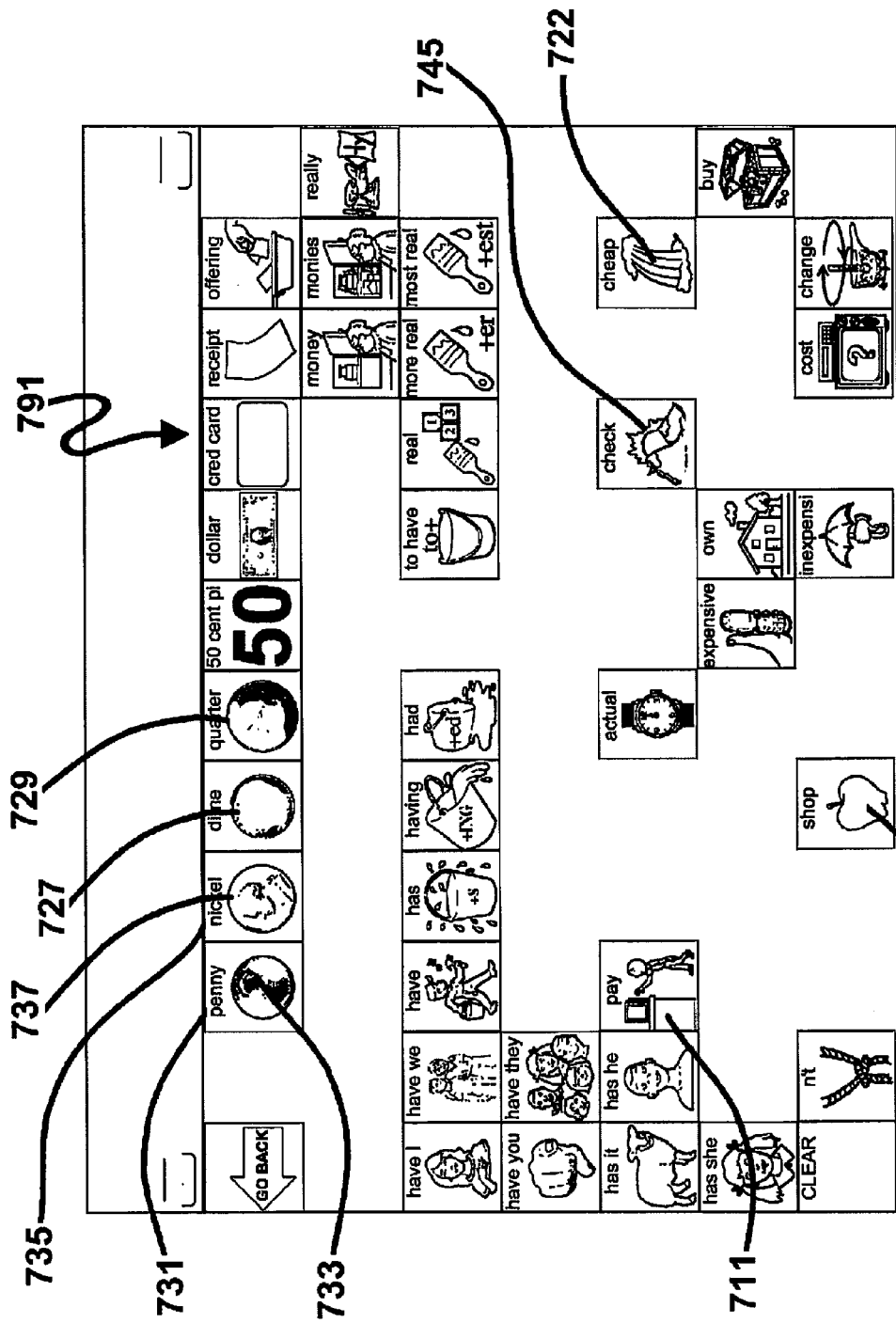

FIG. 5D shows a second level linked electronic screen overlay 791 with an 84 location virtual keyboard similar to the 84 location virtual keyboard of the first level electronic screen overlay in FIG. 5A. This is an example using a two symbol sequence including a polysemous and non-polysemous symbol. This overlay, named the "MONEY" overlay, may be retrieved and displayed when the MONEY symbol 744 (Row 4, Column 7) on the first level linked electronic screen overlay 700 is triggered or selected. The key 731 including the PENNY symbol 733, the key 735 including the NICKEL symbol 737, the key including the DIME symbol 727, and the key including the QUARTER symbol 729 on the second level linked electronic screen overlay 791 in FIG. 5D are non-polysemous symbols that are each associated with fringe vocabulary words that are members of the semantically related category of "money" words. The words associated with each of these non-polysemous symbols, namely "penny," "nickel," "dime," and "quarter" can each be produced with unique sequences of two keystrokes that include one polysemous symbol and one non-polysemous symbol. The polysemous WANT symbol 711, the polysemous MOUNTAIN symbol 745, the polysemous RAINBOW symbol 722, and the polysemous APPLE symbol 726 on the second level linked electronic screen overlay 791 in FIG. 5D all function as the intermediate symbol in at least one sequence of three polysemous symbols. A corresponding third level linked electronic overlay is retrieved and displayed when any of these intermediate polysemous symbols is triggered or selected. The WANT symbol 711, MOUNTAIN symbol 745, RAINBOW symbol 722, and APPLE symbol 726 on the second level linked electronic screen overlay 791 in FIG. 5D are not embellished, meaning that they have the same appearance as the corresponding WANT 711, MOUNTAIN 745, RAINBOW 722, and APPLE 726 symbols of the first level linked electronic screen overlay 700 of FIG. 5A.

Figure 6:
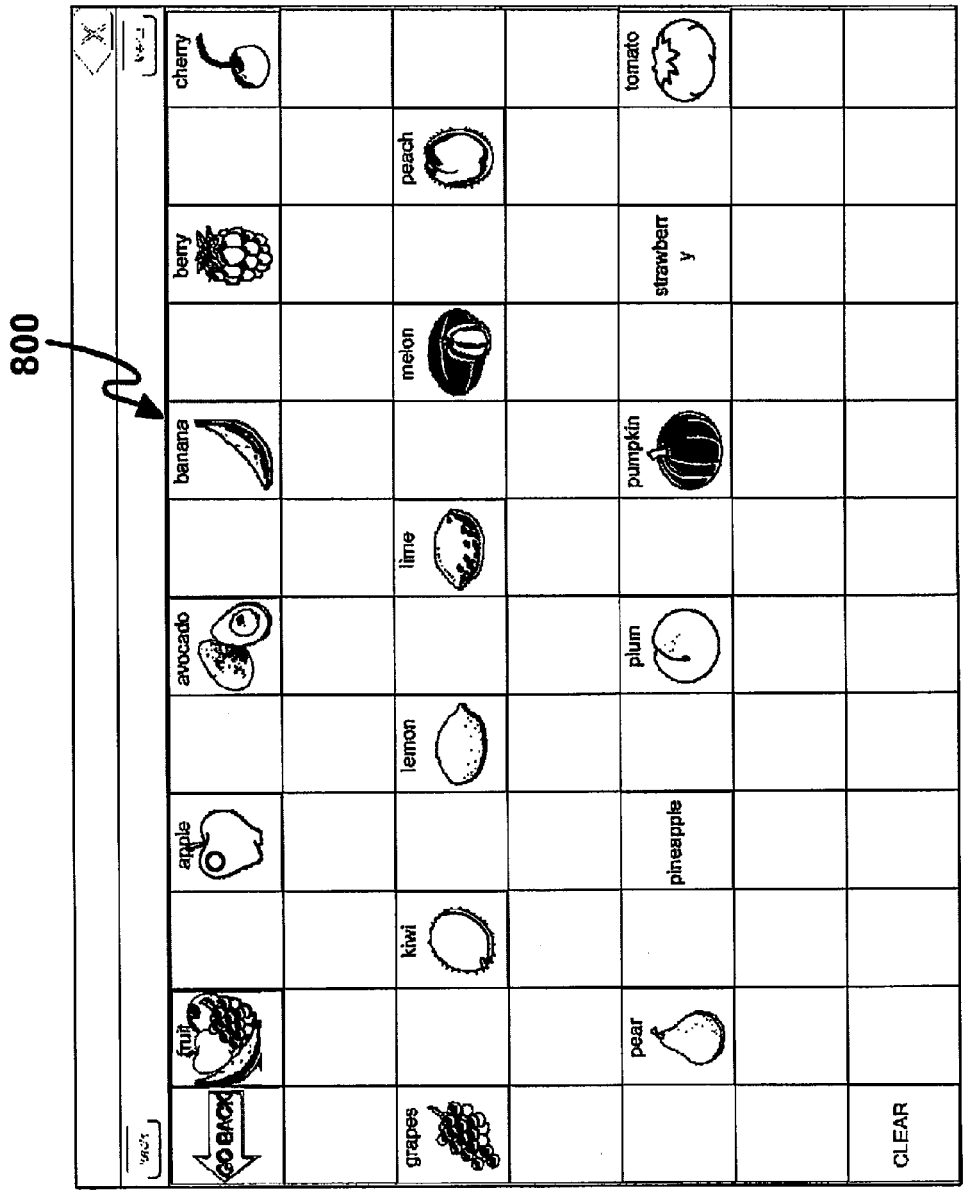
FIG. 6 illustrates an example embodiment of an electronic screen overlay with non-polysemous symbols.

FIG. 6 shows a third level linked electronic screen overlay 800 with an location virtual keyboard similar to the 84 location virtual keyboard of the first level electronic screen overlay 700 in FIG. 5A. This overlay 800, named the "APPLE FRUIT" overlay, may be retrieved and displayed when the polysemous APPLE symbol 726 on the first level linked electronic screen overlay 700 of FIG. 5A is triggered and then the non-polysemous FRUIT symbol 773 on the corresponding second level linked electronic overlay 701 of FIG. 5B is triggered. Each of the locations on the virtual keyboard of the "APPLE FRUIT" overlay of FIG. 6 may include a relatively centrally disposed non-polysemous symbol corresponding to a previously stored message that is a member of the category of "fruit" words. Since all of the locations of the "APPLE FRUIT" overlay may correspond to members of the category of "fruit" words, as many as 84 members of the "fruit" category may be produced with unique sequences of only three keystrokes each.

As such, in at least one embodiment of the present invention, there is a system, method, computer readable medium and/or article of manufacture for accessing fringe vocabulary words on sequentially linked electronic screen overlays with improved efficiency and fewer keystrokes, where at least the initial symbol in a sequence is polysemous and at least the terminal symbol in a sequence is non-polysemous.

In at least one embodiment of the present invention, there is a system, method, computer readable medium and/or article of manufacture for accessing fringe vocabulary words on sequentially linked electronic screen overlays with a sequence of two symbols on two sequentially linked electronic screen overlays. In at least one embodiment of the present invention, the system and/or method comprises at least the following.

Triggering or selection of one of a plurality of polysemous symbols on the first level electronic screen overlay occurs, as described above, to retrieve and display a second level electronic screen overlay with a virtual keyboard, where less than all of the plurality of keys on the virtual keyboard include centrally disposed symbols that are non-polysemous. An operator selects, and the processor 120 receives indication of selection of, a polysemous symbol on the first level electronic screen overlay CORE HOME overlay of the touch sensitive screen 112 as described above. This polysemous symbol is marked in the database in memory 102 with a pointer to a secondary electronic screen overlay. The processor 120 controls contents of this second level electronic screen overlay to replace the content of the CORE HOME overlay on the touch sensitive display 112 from which the initial polysemous symbol was selected.

At least one of the less than all of a plurality of symbols on the currently displayed second level electronic screen overlay that are non-polysemous triggers, upon selection, a previously stored message of a letter, word, morpheme, phrase, sentence, or plural word message, thus functioning as the terminal symbol in a sequence. At least one of the less than all of a plurality of symbols, displayed on the currently displayed second level electronic screen overlay of the touch sensitive display 112, that is non-polysemous is linked in the database stored in memory 120 to a previously stored text string or other type of message, thus functioning as the terminal symbol in a sequence.

The operator triggers (and the processor 120 receives and determines an indication of such) one of the less than all of a plurality of symbols on the currently displayed second level electronic screen overlay that are non-polysemous and function as the terminal symbols in sequences and thereafter the processor 120 triggers output of a previously stored message from memory 102. This triggers production of the corresponding previously stored message and the processor 120 retrieves and displays the first level electronic screen overlay (CORE HOME overlay) so that the operator may begin the next task, production of another symbol sequence, for example.

In at least one embodiment of the present invention, there is a system, method, computer readable medium and/or article of manufacture of for accessing fringe vocabulary words on sequentially linked electronic screen overlays with a sequence of two symbols on two sequentially linked electronic screen overlays, as described above, where the sequence includes an initial polysemous symbol on the first level electronic screen overlay and a terminal non-polysemous symbol on a second level electronic screen overlay.

In at least one embodiment of the present invention, there is a system, method, computer readable medium and/or article of manufacture of for accessing fringe vocabulary words on sequentially linked electronic screen overlays with a sequence of two symbols on two sequentially linked electronic screen overlays, as described above, where an initial polysemous symbol may be triggered on the first level electronic screen overlay to retrieve and display a second-level electronic screen overlay with two or more non-polysemous symbols that function as the terminal symbols in two or more sequences, and where the previously stored messages corresponding to these two or more non-polysemous symbols are members of the same category. For example, non-polysemous symbols corresponding to the words penny, nickel, dime, quarter, and dollar may be located on a second-level electronic screen overlay that is retrieved and displayed when a polysemous money symbol (such as those of FIG. 5D for example) is triggered.

In at least one embodiment of the present invention as will be described hereafter, there is a system, method, computer readable medium and/or article of manufacture of for accessing fringe vocabulary words on sequentially linked electronic screen overlays with a sequence of three symbols on three sequentially linked electronic screen overlays. In at least one embodiment of the present invention as will be described hereafter, the system, method, computer readable medium and/or article of manufacture comprises at least the following.

In at least one embodiment of the present invention as will be described hereafter, the method (and somewhat similarly the apparatus and article of manufacture) includes displaying, on a display 112 for example, a virtual keyboard including a plurality of polysemous symbols for selection on an initial electronic screen overlay; storing, in a memory 102 for example, a plurality of the selectable polysemous symbols in association with a pointer identifying display of an electronic screen overlay which is different from the initial electronic screen overlay; displaying a second electronic screen overlay on the display 112 for example, in response to initial selection of one of the provided polysemous symbols, the second electronic screen overlay being the electronic screen overlay associated with the selected polysemous symbol and including a virtual keyboard wherein less than all of a plurality of key locations on the virtual keyboard include a non-polysemous symbol; and either displaying a third electronic screen overlay on the display in place of the second electronic screen overlay, or outputting at least one of a word, sentence, phoneme, message, letter, number, morpheme, command and phrase, in response to selection of one of the non-polysemous symbols.

In at least one embodiment of a method of the present invention as will be described hereafter, at least a majority of the non-polysemous symbols on the second level electronic screen overlay belong to the same semantic category.

In at least one embodiment of a method of the present invention as will be described hereafter, the third level electronic screen overlay includes a virtual keyboard, and wherein at least a majority of the plurality of keys on the virtual keyboard includes a non-polysemous symbol.

In at least one embodiment of a method of the present invention as will be described hereafter, at least a majority of the non-polysemous symbols on the third level electronic screen overlay belong to the same semantic category.

In at least one embodiment of a method of the present invention as will be described hereafter, the method includes outputting at least one of a word, sentence, phoneme, message, letter, number, morpheme, command and phrase and displaying the initial electronic screen overlay in place of the third electronic screen overlay, in response to the third electronic screen being displayed and in response to subsequent selection of one of the non-polysemous symbols of the third electronic screen overlay.

In at least one embodiment of the invention, a virtual keyboard is initially displayed on an initial electronic screen overlay on display 112 for example, including a plurality of polysemous symbols for selection. The operator then triggers or selects (and the processor 120 detects and determines the location and identity therefore in a manner similar to that described above) one of the plurality of polysemous symbols on the initial or first level electronic screen overlay, to retrieve and display a second level electronic screen overlay with a virtual keyboard (via the processor 120 accessing a pointer stored in memory 102 with the selected symbol as described previously), wherein less than all of the plurality of key locations on the virtual keyboard of the second level electronic screen overlay include a non-polysemous symbol, or preferably a centrally disposed non-polysemous symbol.

Thus, operator first selects (and the processor 120 detects and determines the location and identity therefore in the manner described previously) a polysemous symbol on the first level electronic screen overlay (CORE HOME overlay) as described above. This polysemous symbol may be marked in the database with a pointer to a second level electronic screen overlay in memory 102. The contents of this second level electronic screen overlay, wherein less than all of the plurality of key locations on the virtual keyboard of the second level electronic screen overlay include a non-polysemous symbol, may then replace the content of the CORE HOME overlay on the touch sensitive display 112 from which the initial polysemous symbol was selected.

At least one of the less than all of a plurality of symbols on the currently displayed second level electronic display that are non-polysemous may be associated with a semantically related category (thus the non-polysemous symbols may belong to the same semantically related category), such as for example words, fruits, vegetables, tools, Presidents of the United States, etc.; and may include an embedded link to a third level electronic screen overlay. Such non-polysemous symbols may thus function as an intermediate symbol in a sequence.

The operator triggers or selects one of the less than all of the plurality of non-polysemous symbols, displayed on the currently displayed second level electronic screen overlay, that includes an embedded link (or pointer) to a third level electronic screen overlay. This triggers the processor 120 to retrieve and display a corresponding third level electronic screen overlay that includes a virtual keyboard, where each of the plurality of keys on the virtual keyboard may include a non-polysemous symbol. As such, display of the third electronic overlay may be triggered by selection of a non-polysemous symbol. In a system with 84 total locations for example, the third level electronic screen overlay may contain up to 84 non-polysemous symbols representing fringe vocabulary words.

Of course, it should further be understood at least one of the displayed non-polysemous symbols of the displayed second level electronic screen overlay may also not include an embedded link or pointer, and may instead an output may occur, upon selection of such a non-polysemous symbol, of at least one of a word, sentence, phoneme, message, letter, number, morpheme, command and phrase (in a manner similar to that described previously for example).

At least a majority of the plurality of symbols on the displayed third level electronic screen overlay (if display is triggered) may be non-polysemous, and selection thereof may thereafter trigger output of a previously stored message of a word, phrase, sentence, or plural word message that is a member of the semantically related category of words that relates to the non-polysemous symbol that was just triggered on the second level electronic screen overlay, thus functioning as the terminal symbol in a sequence. For example, if an operator has triggered a non-polysemous symbol that relates to a fruit category on a second level electronic screen overlay, non-polysemous symbols on the corresponding third level electronic screen overlay may include symbols for types of fruits such as apple, banana, grape, pineapple, etc. In another example, if an operator has triggered a non-polysemous symbol that relates to a vegetable category, non-polysemous symbols on the corresponding third level electronic screen overlay may include symbols for types of vegetables such as broccoli, cabbage, and onion.

The operator selects one of the plurality of symbols on the currently displayed third level electronic screen overlay that are non-polysemous, and thus triggers the processor 120 to access a previously stored message. This triggers the output of the corresponding previously stored message. In addition to acting upon a linked text string as described above, the selection of a terminal symbol may also trigger the contents of the currently displayed electronic screen overlay to be replaced by the contents of the first level electronic screen overlay (CORE HOME overlay) in a manner similar to that described above (simultaneous or subsequent to the output).

In at least one embodiment of the present invention, there is a system, method, computer readable medium and/or article of manufacture for accessing fringe vocabulary words on sequentially linked electronic screen overlays with a sequence of three symbols on three sequentially linked electronic screen overlays, as described above, where the sequence includes an initial polysemous symbol on the first level electronic screen overlay, an intermediate non-polysemous symbol on a second level electronic screen overlay, and a terminal non-polysemous symbol on a third level electronic screen overlay.

In at least one embodiment of the present invention, there is a system, method, computer readable medium and/or article of manufacture for accessing fringe vocabulary words on sequentially linked electronic screen overlays with a sequence of three symbols on three sequentially linked electronic screen overlays, as described above, where an initial polysemous symbol may be triggered on the first level electronic screen overlay to retrieve and display a second-level electronic screen overlay that includes at least one non-polysemous symbol that functions as an intermediate symbol in two or more sequences, and where these at least one non-polysemous symbols may be related to a semantic category. For example, a non-polysemous "ROOM" symbol may be used as the intermediate symbol in sequences to produce "bedroom," "cafeteria," "bathroom," "garage," and "gym," because all of these words are members of the category ROOM.

In at least one embodiment of the present invention, there is a system, method, computer readable medium and/or article of manufacture for accessing fringe vocabulary words on sequentially linked electronic screen overlays with a sequence of three symbols on three sequentially linked electronic screen overlays, as described above, where an initial polysemous symbol may be triggered on the first level electronic screen overlay to retrieve and display a second-level electronic screen overlay that includes at least two non-polysemous symbols that each function as intermediate symbols in two or more sequences, as described above. As such, the second level electronic screen overlay may contain multiple intermediate symbols that are non-polysemous, each of which may relate to a different semantic category. For example intermediate non-polysemous symbols for the categories "FRUIT," "MEAT," and "MEXICAN FOOD" may all be available on the second level electronic screen overlay 701 that is displayed when the polysemous APPLE symbol 726 is selected on the first-level electronic screen overlay 700. In at least one embodiment of the present invention, there is a system, method, computer readable medium and/or article of manufacture for accessing fringe vocabulary on sequentially linked electronic screen overlays with a sequence of three symbols on three sequentially linked electronic screen overlays, as described above, where the intermediate non-polysemous symbol corresponds to a category of words, as described above, and where the terminal non-polysemous symbol triggers a previously stored message of a word, phrase, sentence, or plural word message that is a member of the semantic category corresponding to the intermediate non-polysemous symbol.

In at least one embodiment of the present invention, there is a system, method, computer readable medium and/or article of manufacture for accessing fringe vocabulary words on sequentially linked electronic screen overlays with sequences of three symbols on three sequentially linked electronic screen overlays, as described above, where two or more sequences include the same intermediate non-polysemous symbol on the same second level electronic screen overlay, as described above, and different terminal non-polysemous symbols on the same third level electronic screen overlay.

In at least one embodiment of the present invention, there is a system, method, computer readable medium and/or article of manufacture for accessing fringe vocabulary words on sequentially linked electronic screen overlays with sequences of three symbols on three sequentially linked electronic screen overlays, as described above, where two or more sequences include the same intermediate non-polysemous symbol on the same second level electronic screen overlay, as described above, and different terminal non-polysemous symbols on the same third level electronic screen overlay, and where each of the terminal non-polysemous symbols triggers a previously stored message of a word, phrase, sentence, or plural word message that is a member of the semantic category corresponding to the intermediate non-polysemous symbol.

In at least one embodiment of the present invention, there is a system, method, computer readable medium and/or article of manufacture for accessing fringe vocabulary words on sequentially linked electronic screen overlays with a sequence of three symbols on three sequentially linked electronic screen overlays, as described above, where a third level electronic screen overlay includes a virtual keyboard and each of a plurality of keys on that virtual keyboard may optionally include a centrally disposed non-polysemous symbol that functions as the terminal symbol in a sequence of three symbols on three sequentially linked electronic screen overlays.

In at least one embodiment of the present invention, there is a system, method, computer readable medium and/or article of manufacture for accessing fringe vocabulary words on sequentially linked electronic screen overlays with a sequence of three symbols on three sequentially linked electronic screen overlays, as described above, where a third level electronic screen overlay includes a virtual keyboard and all of a plurality of keys on that virtual keyboard include a centrally disposed non-polysemous symbol that functions as the terminal symbol in a sequence of three symbols on three sequentially linked electronic screen overlays.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a tangible computer readable medium and is adapted to perform any one of the aforementioned methods when run on a computer device (a device including a processor 120). Thus, the tangible storage medium or tangible computer readable medium, is adapted to store information and is adapted to interact with a data processing facility or computer device to execute the program of any of the above mentioned embodiments and/or to perform the method of any of the above mentioned embodiments.

The tangible computer readable medium or tangible storage medium may be a built-in medium installed inside a computer device main body or a removable tangible medium arranged so that it can be separated from the computer device main body. Examples of the built-in tangible medium include, but are not limited to, rewriteable non-volatile memories, such as ROMs and flash memories, and hard disks. Examples of the removable tangible medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method, comprising:
providing polysemous symbols for selection on an initial electronic screen overlay displayed on a display, a plurality of the polysemous symbols being displayed with at least one word;
storing, in a memory, a plurality of the selectable polysemous symbols in association with a pointer identifying display of an electronic screen overlay which is different from the initial electronic screen overlay;
displaying on the display, in response to initial selection of one of the provided polysemous symbols, the second electronic screen overlay different from the initial electronic screen overlay and including a plurality of symbols, each of the plurality of symbols of the second electronic screen overlay being associated with the selected polysemous symbol and at least one of the plurality of the polysemous sysmbols of the second electronic screen overlay being displayed with at least one word different from the at least one word displayed with a similarly situated polysemous symbol previously displayed for selection on the initial electronic screen overlay; and
in response to selection of one of the symbols on the displayed second electronic screen overlay, either
displaying a third electronic screen overlay on the display which is different from the second electronic screen overlay and which includes symbols associated with the selected one of the symbols on the displayed second electronic screen overlay, or
outputting at least one of a word, phoneme, message and phrase, the output at least one of a word, sentence, phoneme, message, letter, number, morpheme, command and phrase being stored in the memory in association with a symbol sequence including the initially selected polysemous symbol and the selected one of the symbols on the displayed second electronic screen overlay.

2. The method of claim 1, wherein the second electronic screen overlay is displayed in place of the initial electronic screen overlay.

3. The method of claim 2, further comprising:
receiving via a processor, an indication of selection of the one of the provided polysemous symbols; and
controlling, via the processor, the display to display the second electronic screen overlay associated with the selected polysemous symbol in place of the initial electronic screen overlay upon the processor receiving the indication of selection.

4. The method of claim 3, further comprising:
receiving, via the processor, an indication of selection of one of the provided symbols on the displayed second electronic screen overlay; and
controlling, via the processor, output of at least one of a word, sentence, phoneme, message, letter, number, morpheme, command and phrase in response the processor receiving an indication of selection of one of the provided symbols on the displayed second electronic screen overlay, the output at least one of a word, sentence, phoneme, message, letter, number, morpheme, command and phrase being stored in the memory in association with a symbol sequence including the initially selected polysemous symbol and the selected one of the provided symbols on the displayed second electronic screen overlay.

5. The method of claim 3, further comprising:
controlling, via the processor, display of the initial electronic screen overlay in place of the second electronic screen overlay, subsequent or simultaneous to the output of the at least one of a word, sentence, phoneme, message, letter, number, morpheme, command and phrase.

6. The method of claim 1, further comprising:
receiving via a processor, an indication of selection of the one of the provided polysemous symbols; and
controlling, via the processor, the display to display the second electronic screen overlay associated with the selected polysemous symbol upon the processor receiving the indication of selection.

7. The method of claim 3, further comprising:
receiving, via the processor, an indication of selection of one of the provided symbols on the displayed second electronic screen overlay; and
controlling, via the processor, output of at least one of a word, sentence, phoneme, message, letter, number, morpheme, command and phrase in response the processor receiving an indication of selection of one of the provided symbols on the displayed second electronic screen overlay, the output at least one of a word, sentence, phoneme, message, letter, number, morpheme, command and phrase being stored in the memory in association with a symbol sequence including the initially selected polysemous symbol and the selected one of the provided symbols on the displayed second electronic screen overlay.

8. The method of claim 6, further comprising:
controlling, via the processor, display of the initial electronic screen overlay subsequent or simultaneous to the output of the at least one of a word, sentence, phoneme, message, letter, number, morpheme, command and phrase.

9. The method of claim 1, further comprising:
storing a plurality of the selectable polysemous symbols, displayed on the second electronic screen overlay, in association with a pointer identifying display of the third electronic screen overlay, the third electronic screen overlay being different from the second electronic screen overlay and including symbols associated with the selected one of the polysemous symbols of the displayed second electronic screen overlay.

10. The method of claim 9, wherein the third electronic screen overlay is displayed in place of the second electronic screen overlay.

11. The method of claim 10, further comprising:
receiving via a processor, an indication of selection of the one of the polysemous symbols displayed on the second electronic screen overlay; and
controlling, via the processor, the display to display the third electronic screen overlay associated with the selected one of the polysemous symbols displayed on the second electronic screen overlay upon the processor receiving the indication of selection.

12. The method of claim 11, further comprising:
receiving, via the processor, an indication of selection of one of the provided symbols on the displayed third electronic screen overlay; and
controlling, via the processor, output of at least one of a word, sentence, phoneme, message, letter, number, morpheme, command and phrase in response the processor receiving an indication of selection of one of the provided symbols on the displayed third electronic screen overlay, the output at least one of a word, sentence, phoneme, message, letter, number, morpheme, command and phrase being stored in the memory in association with a symbol sequence including the initially selected polysemous symbol, the selected one of the provided symbols on the displayed second electronic screen overlay, and the selected one of the provided symbols on the displayed third electronic screen overlay.

13. The method of claim 10, further comprising:
outputting at least one of a word, sentence, phoneme, message, letter, number, morpheme, command and phrase in response to selection of one of the provided symbols on the displayed third electronic screen overlay, the output at least one of a word, sentence, phoneme, message, letter, number, morpheme, command and phrase being stored in the memory in association with a symbol sequence including the initially selected polysemous symbol, the selected one of the provided symbols on the displayed second electronic screen overlay, and the selected one of the provided symbols on the displayed third electronic screen overlay.

14. The method of claim 13, further comprising:
controlling, via the processor, display of the initial electronic screen overlay in place of the third electronic screen overlay, subsequent or simultaneous to the output of the at least one of a word, sentence, phoneme, message, letter, number, morpheme, command and phrase.

15. The method of claim 9, further comprising:
receiving via a processor, an indication of selection of the one of the polysemous symbols displayed on the second electronic screen overlay; and
controlling, via the processor, the display to display the third electronic screen overlay associated with the selected one of the polysemous symbols displayed on the second electronic screen overlay upon the processor receiving the indication of selection.

16. The method of claim 15, further comprising:
receiving, via the processor, an indication of selection of one of the provided symbols on the displayed third electronic screen overlay; and
controlling, via the processor, output of at least one of a word, sentence, phoneme, message, letter, number, morpheme, command and phrase in response the processor receiving an indication of selection of one of the provided symbols on the displayed third electronic screen overlay, the output at least one of a word, sentence, phoneme, message, letter, number, morpheme, command and phrase being stored in the memory in association with a symbol sequence including the initially selected polysemous symbol, the selected one of the provided symbols on the displayed second electronic screen overlay, and the selected one of the provided symbols on the displayed third electronic screen overlay.

17. The method of claim 8, further comprising:
outputting at least one of a word, sentence, phoneme, message, letter, number, morpheme, command and phrase in response to selection of one of the provided symbols on the displayed third electronic screen overlay, the output at least one of a word, sentence, phoneme, message, letter, number, morpheme, command and phrase being stored in the memory in association with a symbol sequence including the initially selected polysemous symbol, the selected one of the provided symbols on the displayed second electronic screen overlay, and the selected one of the provided symbols on the displayed third electronic screen overlay.

18. The method of claim 17, further comprising:
controlling, via the processor, display of the initial electronic screen overlay subsequent or simultaneous to the output of the at least one of a word, sentence, phoneme, message, letter, number, morpheme, command and phrase.

19. The method of claim 1, wherein a unique name for each of the plurality of linked electronic screen overlays that corresponds to the symbol sequence is stored in memory.

20. A non-transitory computer readable medium including program segments for, when executed on a computer system, causing the computer system to implement the method of claim 1.

21. An apparatus, comprising:
an integrated input and display device configured to provide displayed polysemous symbols for selection on an initial electronic screen overlay, a plurality of the polysemous symbols being displayed with at least one word; and
a memory configured to store a plurality of the selectable polysemous symbols in association with a pointer identifying display of an electronic screen overlay which is different from the initial electronic screen overlay,
the integrated input and display device being configured to display a second electronic screen overlay, in response to selection of one of the provided polysemous symbols, different from the initial electronic screen overlay and including a plurality of symbols, each of the plurality of symbols of the second electronic screen overlay being associated with the selected polysemous symbol and at least one of the plurality of the polysemous symbols of the second electronic screen overlay being displayed with at least one word different from the at least one word displayed with a similarly situated polysemous symbol previously displayed for selection on the initial electronic screen overlay; and
in response to selection of one of the symbols on the displayed second electronic screen overlay, either
the integrated input and display device being configured to display a third electronic screen overlay on the display which is different from the second electronic screen overlay and which includes symbols associated with the selected one of the symbols on the displayed second electronic screen overlay, or
an output device being configured to output at least one of a word, phoneme, message and phrase, the output at least one of a word, sentence, phoneme, message, letter, number, morpheme, command and phrase being stored in the memory in association with a symbol sequence including the initially selected polysemous symbol and the selected one of the symbols on the displayed second electronic screen overlay.

22. The apparatus of claim 21, wherein the second electronic screen overlay displayed on the integrated input and display device is displayed, in response to receiving an indication of selection of the associated one of the provided polysemous symbols, in place of the initial electronic screen overlay.

23. The apparatus of claim 22, further comprising:
a processor, configured to receive an indication of selection of the one of the provided polysemous symbols and configured to control the integrated input and display device to display the second electronic screen overlay associated with the selected polysemous symbol in place of the initial electronic screen overlay upon the processor receiving the indication of selection.

24. The apparatus of claim 23, further comprising:

a processor, configured to receive an indication of selection of one of the provided symbols on the displayed second electronic screen overlay and configured to control the output of at least one of a word, sentence, phoneme, message, letter, number, morpheme, command and phrase in response the processor receiving an indication of selection of one of the provided symbols on the displayed second electronic screen overlay, the output at least one of a word, sentence, phoneme, message, letter, number, morpheme, command and phrase being stored in the memory in association with a symbol sequence including the initially selected polysemous symbol and the selected one of the provided symbols on the displayed second electronic screen overlay.

25. The apparatus of claim 22, wherein the processor is further configured to receive an indication of selection of the one of the provided polysemous symbols and to control the display to display the second electronic screen overlay associated with the selected polysemous symbol in place of the initial electronic screen overlay upon the processor receiving the indication of selection.

26. The apparatus of claim 22, further comprising:

the output device, configured to output the at least one of a word, sentence, phoneme, message, letter, number, morpheme, command and phrase in response to selection of one of the provided symbols on the displayed second electronic screen overlay, the output at least one of a word, sentence, phoneme, message, letter, number, morpheme, command and phrase being stored in the memory in association with a symbol sequence including the initially selected polysemous symbol and the selected one of the provided symbols on the displayed second electronic screen overlay.

27. The apparatus of claim 21, further comprising:

a processor, configured to receive an indication of selection of the one of the provided polysemous symbols and configured to control the integrated input and display device to display the second electronic screen overlay associated with the selected polysemous symbol upon the processor receiving the indication of selection.

28. The apparatus of claim 27, further comprising:

a processor, configured to receive an indication of selection of one of the provided symbols on the displayed second electronic screen overlay and configured to control the output of at least one of a word, sentence, phoneme, message, letter, number, morpheme, command and phrase in response the processor receiving an indication of selection of one of the provided symbols on the displayed second electronic screen overlay, the output at least one of a word, sentence, phoneme, message, letter, number, morpheme, command and phrase being stored in the memory in association with a symbol sequence including the initially selected polysemous symbol and the selected one of the provided symbols on the displayed second electronic screen overlay.

29. The apparatus of claim 21, further comprising:

the output device, configured to output the at least one of a word, sentence, phoneme, message, letter, number, morpheme, command and phrase in response to selection of one of the provided symbols on the displayed second electronic screen overlay, the output at least one of a word, sentence, phoneme, message, letter, number, morpheme, command and phrase being stored in the memory in association with a symbol sequence including the initially selected polysemous symbol and the selected one of the provided symbols on the displayed second electronic screen overlay.

30. The apparatus of claim 21, wherein the memory is further configured to store a plurality of the selectable polysemous symbols, displayed on the second electronic screen overlay, in association with a pointer identifying display of third electronic screen overlay which is different from the second electronic screen overlay and wherein the integrated input and display is configured to display a third electronic screen overlay, in response to selection of one of the selectable polysemous symbols of the displayed second electronic screen overlay, the third electronic screen overlay being different from the displayed second electronic screen overlay and including symbols associated with the selected one of the symbols on the displayed second electronic screen overlay.

31. The apparatus of claim 30, wherein the third electronic screen overlay is displayed in place of the second electronic screen overlay.

32. The apparatus of claim 31, further comprising:

a processor, configured to receive an indication of selection of the one of the polysemous symbols displayed on the second electronic screen overlay and configured to control the display to display the third electronic screen overlay including symbols associated with the selected one of the polysemous symbols displayed on the second electronic screen overlay upon the processor receiving the indication of selection.

33. The apparatus of claim 32, wherein the processor is configured to receive an indication of selection of one of the provided symbols on the displayed third electronic screen overlay and is configured to control output of at least one of a word, sentence, phoneme, message, letter, number, morpheme, command and phrase in response the processor receiving an indication of selection of one of the provided symbols on the displayed third electronic screen overlay, the output at least one of a word, sentence, phoneme, message, letter, number, morpheme, command and phrase being stored in the memory in association with a symbol sequence including the initially selected polysemous symbol, the selected one of the provided symbols on the displayed second electronic screen overlay, and the selected one of the provided symbols on the displayed third electronic screen overlay.

34. The apparatus of claim 31, further comprising:

an output device configured to output at least one of a word, sentence, phoneme, message, letter, number, morpheme, command and phrase in response to selection of one of the provided symbols on the displayed third electronic screen overlay, the output at least one of a word, sentence, phoneme, message, letter, number, morpheme, command and phrase being stored in the memory in association with a symbol sequence including the initially selected polysemous symbol, the selected one of the provided symbols on the displayed second electronic screen overlay, and the selected one of the provided symbols on the displayed third electronic screen overlay.

35. The apparatus of claim 34, wherein the processor is further configured to control the display to display the initial electronic screen overlay on the display, in place of the third electronic screen overlay, subsequent or simultaneous to the output of the at least one of a word, sentence, phoneme, message, letter, number, morpheme, command and phrase.

36. The apparatus of claim 30, further comprising:

a processor, configured to receive an indication of selection of the one of the polysemous symbols displayed on the second electronic screen overlay and configured to control the display to display the third electronic screen overlay including symbols associated with the selected one of the polysemous symbols displayed on the second electronic screen overlay upon the processor receiving the indication of selection.

37. The apparatus of claim 36, wherein the processor is configured to receive an indication of selection of one of the provided symbols on the displayed third electronic screen overlay and is configured to control output of at least one of a word, sentence, phoneme, message, letter, number, morpheme, command and phrase in response the processor receiving an indication of selection of one of the provided symbols on the displayed third electronic screen overlay, the output at least one of a word, sentence, phoneme, message, letter, number, morpheme, command and phrase being stored in the memory in association with a symbol sequence including the initially selected polysemous symbol, the selected one of the provided symbols on the displayed second electronic screen overlay, and the selected one of the provided symbols on the displayed third electronic screen overlay.

38. The apparatus of claim 30, further comprising:
an output device configured to output at least one of a word, sentence, phoneme, message, letter, number, morpheme, command and phrase in response to selection of one of the provided symbols on the displayed third electronic screen overlay, the output at least one of a word, sentence, phoneme, message, letter, number, morpheme, command and phrase being stored in the memory in association with a symbol sequence including the initially selected polysemous symbol, the selected one of the provided symbols on the displayed second electronic screen overlay, and the selected one of the provided symbols on the displayed third electronic screen overlay.

39. The apparatus of claim 38, wherein the processor is further configured to control the display to display the initial electronic screen overlay on the display subsequent or simultaneous to the output of the at least one of a word, sentence, phoneme, message, letter, number, morpheme, command and phrase.

40. The apparatus of claim 21, wherein a unique name for each of the plurality of linked electronic screen overlays that corresponds to the symbol sequence is stored in memory.

41. A method, comprising:
displaying, on a display, a virtual keyboard including a plurality of polysemous symbols for selection on an initial electronic screen overlay, a plurality of the polysemous symbols being displayed with at least one word;
storing, in a memory, a plurality of the selectable polysemous symbols in association with a pointer identifying display of an electronic screen overlay which is different from the initial electronic screen overlay;
displaying a second electronic screen overlay on the display, in response to initial selection of one of the provided polysemous symbols, the second electronic screen overlay being different from the initial electronic screen overlay and including a plurality of symbols, each of the plurality of symbols of the second electronic screen overlay being associated with the selected polysemous symbol and including a virtual keyboard wherein less than all of a plurality of key locations on the virtual keyboard include a non-polysemous symbol, at least one of the plurality of the polysemous symbols of the second electronic screen overlay being displayed with at least one word different from the at least one word displayed with a similarly situated polysemous symbol previously displayed for selection on the initial electronic screen overlay;
displaying a third electronic screen overlay on the display in place of the second electronic screen overlay, or outputting at least one of a word, sentence, phoneme, message, letter, number, morpheme, command and phrase, in response to selection of one of the non-polysemous symbols; and
outputting at least one of a word, sentence, phoneme, message, letter, number, morpheme, command and phrase and displaying the initial electronic screen overlay in place of the third electronic screen overlay, in response to the third electronic screen being displayed and in response to subsequent selection of one of the non-polysemous symbols of the third electronic screen overlay.

42. The method of claim 41, wherein at least a majority of the non-polysemous symbols on the second electronic screen overlay belong to the same semantic category.

43. The method of claim 41, wherein the third electronic screen overlay includes a virtual keyboard, and wherein at least a majority of the plurality of keys on the virtual keyboard includes a non-polysemous symbol.

44. The method of claim 43, wherein at least a majority of the non-polysemous symbols on the third electronic screen overlay belong to the same semantic category.

45. A non-transitory computer readable medium including program segments for, when executed on a computer system, causing the computer system to implement the method of claim 41.

46. The method of claim 41, wherein a unique name for each of the plurality of linked electronic screen overlays that corresponds to the symbol sequence is stored in memory.

47. A apparatus, comprising:
an integrated input and display configured to display a virtual keyboard including a plurality of polysemous symbols for selection on an initial electronic screen overlay, a plurality of the polysemous symbols being displayed with at least one word;
a memory, configured to store a plurality of the selectable polysemous symbols in association with a pointer identifying display of an electronic screen overlay which is different from the initial electronic screen overlay;
a processor configured to determine initial selection of one of the provided polysemous symbols, and configured to control the display of a second electronic screen overlay on the integrated input and display, in response to the determined initial selection, the second electronic screen overlay being different from the initial electronic screen overlay and including a plurality of symbols, each of the plurality of symbols of the second electronic screen overlay being associated with the selected polysemous symbol and including a virtual keyboard wherein less than all of a plurality of key location on the virtual keyboard include a non-polysemous symbol, at least one of the plurality of the polysemous symbols of the second electronic screen overlay being displayed with at least one word different from the at least one word displayed with a similarly situated polysemous symbol previously displayed for selection on the initial electronic screen overlay, the integrated input and display device being further configured to either control output of at least one of a word, sentence, phoneme, message, letter, number, morpheme, command and phrase or display a third electronic screen overlay on the display in place of the second electronic screen overlay, in response to the processor determining selection of one of the non-polysemous symbols; and an output device, configured to output at least one of a word, sentence, phoneme, message, letter, number, morpheme, command and phrase, the initial electronic screen overlay being displayed in place of the third electronic screen overlay, in response to the processor controlling the display of the third electronic screen and in response to the processor subsequently determining selection of one of the non-polysemous symbols of the third electronic screen overlay.

48. The apparatus of claim 47, wherein at least a majority of the non-polysemous symbols on the second electronic screen overlay belong to the same semantic category.

49. The apparatus of claim 47, wherein the third electronic screen overlay includes a virtual keyboard, and wherein at least a majority of the plurality of keys on the virtual keyboard includes a non-polysemous symbol.

50. The apparatus of claim 49, wherein at least a majority of the non-polysemous symbols on the third electronic screen overlay belong to the same semantic category.

51. The apparatus of claim 47, wherein a unique name for each of the plurality of linked electronic screen overlays that corresponds to the symbol sequence is stored in memory.

* * * * *